United States Patent
Wang et al.

(10) Patent No.: US 9,648,317 B2
(45) Date of Patent: May 9, 2017

(54) METHOD OF CODING VIDEO AND STORING VIDEO CONTENT

(71) Applicant: Qualcomm Incorporated, San Diego, CA (US)

(72) Inventors: Ye-Kui Wang, San Diego, CA (US); Ying Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 754 days.

(21) Appl. No.: 13/753,247

(22) Filed: Jan. 29, 2013

(65) Prior Publication Data

US 2013/0195205 A1 Aug. 1, 2013

Related U.S. Application Data

(60) Provisional application No. 61/592,462, filed on Jan. 30, 2012.

(51) Int. Cl.
*H04N 7/12* (2006.01)
*H04N 19/174* (2014.01)
*H04N 19/70* (2014.01)
*H04N 19/46* (2014.01)

(52) U.S. Cl.
CPC ........ *H04N 19/00272* (2013.01); *H04N 19/46* (2014.11); *H04N 19/70* (2014.11)

(58) Field of Classification Search
USPC ........................................................ 375/240
See application file for complete search history.

(56) References Cited

U.S. PATENT DOCUMENTS

| | | | |
|---|---|---|---|
| 7,613,727 B2 | 11/2009 | Visharam et al. | |
| 7,724,818 B2 | 5/2010 | Hannuksela et al. | |
| 7,882,059 B2 * | 2/2011 | Hirose et al. | 707/609 |
| 8,223,849 B2 | 7/2012 | Lu et al. | |
| 8,300,705 B2 | 10/2012 | Lee et al. | |
| 8,532,196 B2 | 9/2013 | Noda et al. | |
| 8,660,189 B2 | 2/2014 | Toma et al. | |
| 2006/0233247 A1 | 10/2006 | Visharam et al. | |

(Continued)

FOREIGN PATENT DOCUMENTS

| | | |
|---|---|---|
| CN | 101120593 A | 2/2008 |
| CN | 102238390 A | 11/2011 |

(Continued)

OTHER PUBLICATIONS

ISO/IEC 14496-15 Second Edition Jun. 1, 2010 Part 15: AVC file format.*

(Continued)

*Primary Examiner* — Tracy Y Li
(74) *Attorney, Agent, or Firm* — Shumaker & Sieffert, P.A.

(57) ABSTRACT

A device comprising a video file creation module is configured to obtain a plurality of slices of coded video content. Parameter sets are associated with the coded video content. The video creation module encapsulates the plurality of slices of coded video content within one or more access units of a video stream. A first type of parameter set may be encapsulated within one or more access units of the video stream. A second type of parameter set may be encapsulated within a sample description. The sample description may include stream properties associated with the video stream.

22 Claims, 7 Drawing Sheets

(56) References Cited

U.S. PATENT DOCUMENTS

| | | | |
|---|---|---|---|
| 2006/0256851 A1* | 11/2006 | Wang | H04N 21/234327 375/240.01 |
| 2007/0076799 A1 | 4/2007 | Wan | |
| 2007/0098083 A1 | 5/2007 | Visharam et al. | |
| 2012/0023249 A1 | 1/2012 | Chen et al. | |
| 2012/0063749 A1* | 3/2012 | Kamijima | 386/328 |
| 2013/0195171 A1 | 8/2013 | Wang et al. | |
| 2013/0195172 A1 | 8/2013 | Wang et al. | |
| 2013/0195173 A1 | 8/2013 | Wang et al. | |

FOREIGN PATENT DOCUMENTS

| | | |
|---|---|---|
| JP | 2006507553 A | 3/2006 |
| JP | 2006203662 A | 8/2006 |
| JP | 2008518516 A | 5/2008 |
| WO | 03073770 A1 | 9/2003 |
| WO | 2006047448 A2 | 5/2006 |
| WO | 2006108917 A1 | 10/2006 |
| WO | 2007136093 A1 | 11/2007 |
| WO | 2012012574 A1 | 1/2012 |

OTHER PUBLICATIONS

Sjoberg, R. JCTVC-G607 High-Level Syntax for Bitstream Extraction Nov. 26, 2011.*

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/5C29/WG11, 8th Meeting: San Jose, CA, USA, Feb. 1-10, 2012, 259 pp.

ITU-T H.265, Series H: Audiovisual and Multimedia Systems, Infrastructure of audiovisual services—Coding of moving video, High efficiency video coding, The International Telecommunication Union. Apr. 2013, 317 pp.

Second Written Opinion from International Application No. PCT/US2013/023872, dated Jan. 9, 2014, 5 pp.

International Preliminary Report on Patentability—PCT/US2013/023872, The International Bureau of WIPO—Geneva, Switzerland, dated Apr. 2, 2014, 9 pp.

Information Technology—Coding of audio-visual objects—Part 15: Advanced Video Coding (AVC) file format, Amendment 2: Carriage of High efficiency video coding (HEVC), ISO/IEC 14496-15:2010/PDAM 2, May 4, 2012, 17 pp.

Information Technology—Coding of audio-visual objects—Part 15: Advanced Video Coding (AVC) file format, ISO/IEC 14496-15:2010(E), Jan. 22, 2010, 95 pp.

Information Technology—Coding of audio-visual objects—Part 15: Advanced Video Coding (AVC) file format, Amendment 1: Sub-track definitions, ISO/IEC 14496-15:2010/Amd.1:2011(E), Jul. 22, 2011, 15 pp.

Wiegand et al., "WD1: Working Draft 1 of High-Efficiency Video Coding," Document JCTVC-C403, 3rd Meeting: Guangzhou, CN, Oct. 7-15, 2010, 137 pp.

Wiegand et al., "WD2: Working Draft 2 of High-Efficiency Video Coding," Document JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," Document JCTVC-F803_d2, 6th Meeting: Torino, IT, Jul. 14-22, 2011, 226 pp.

Bross et al., "WD5: Working Draft 5 of High-Efficiency Video Coding," Document JCTVC-G1103_d2, 7th Meeting: Geneva, CH, Nov. 21-30, 2011, 214 pp.

International Search Report and Written Opinion—PCT/U52013/023872—ISA/EPO—May 2, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Sjoberg et al., "High-Level Syntax for Bitstream Extraction," Document JCTVC-G607, WG11 No. m22172, 7th Meeting: Geneva, CH, Nov. 21-30, 2011, 14 pp.

Wang et al., "On HEVC file format," Document MPEG2011/M24751, International Organisation for Standardisation, Geneva, Switzerland, Apr.-May, 2012, 2 pp.

Bross et al., "High efficiency video coding (HEVC) text specification draft 6," Document JCTVC-H1003, 7th Meeting: Geneva, CH, Nov. 21-30, 2011, 259 pp.

Bross et al., "High efficiency video coding (HEVC) text specification draft 7," Document JCTVC-I1003_d2, 9th Meeting: Geneva, CH, Apr. 27-May 7, 2012, 290 pp.

Bross et al., "High efficiency video coding (HEVC) text specification draft 8," Document JCTVC-J1003_d7, 10th Meeting: Stockholm, SE, Jul. 11-20, 2012, 261 pp.

Bross et al., "High efficiency video coding (HEVC) text specification draft 9," Document JCTVC-K1003_v7, 11th Meeting: Shanghai, CN, Oct. 10-19, 2012, 290 pp.

Bross et al., "High efficiency video coding (HEVC) text specification draft 10 (For FDIS & Last Call)," Document JCTVC-L1003_v34, 12th Meeting: Geneva, CH, Jan. 14-23, 2013, 310 pp.

Boyce et al., "Extensible High Layer Syntax for Scalability," JCT-VC Meeting; Mar. 16-23, 2011; Geneva, CH; (Joint Collaborative Team on Video Coding of ISO/IEC JTC1/SC29/WG11 and ITU-T SG.16 ); URL: http://wftp3.itu.int/av-arch(jctvc-site/, No. JCTVC-E279, Mar. 11, 2011, 10 pp. XP030008785, ISSN: 0000-0007 section 2.5.

* cited by examiner

ACCESS UNIT 150

| LENGTH | AU DELIMITER NAL UNIT | LENGTH | SEI NAL UNIT | LENGTH | SLICE NAL UNIT | LENGTH | SLICE NAL UNIT |

FIG. 2

METHOD OF CODING VIDEO AND STORING VIDEO CONTENT

RELATED APPLICATIONS

This application claims the benefit of:

U.S. Provisional Application No. 61/592,462, filed Jan. 30, 2012; which is hereby incorporated by reference in its entirety.

TECHNICAL FIELD

This disclosure relates to video coding and storing video content and more particularly to techniques for encapsulating parameter sets and other parameters within a video file.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding tree units (CTUs), coding tree blocks (CTBs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure relates to various techniques for storing video data. In particular, this disclosure describes technique for encapsulating parameter sets and other parameters within a video file.

In one example of the disclosure, a method of generating a video file including coded video content comprises obtaining a plurality of slices of coded video content; obtaining a plurality of parameter sets associated with the plurality of slices of video content; encapsulating the plurality of slices of coded video content within one or more access units of a video stream; encapsulating a first type of parameter set within the one or more access units of the video stream; and encapsulating a second type of parameter set within a sample description, wherein the sample description includes an indicator identifying a number of parameter sets stored within one or more access units of the video stream.

In one example of the disclosure, a method of generating a video file including coded video content comprises obtaining a plurality of slices of coded video content; obtaining a plurality of parameter sets associated with the plurality of slices of video content; and encapsulating a plurality of parameter sets within a sample description of the file track, wherein parameter set network abstraction layer units correspond to a type of parameter set are included in a dedicated array in the sample description.

In one example of the disclosure, a method of generating a video file including coded video content comprises obtaining a plurality of slices of coded video content; encapsulating the plurality of slices of coded video content within a plurality of access units of a video stream; obtaining a plurality of stream properties associated with the video stream; and encapsulating a stream properties within a sample description of a file track, wherein the stream properties include at least one of a frame rate and a spatial resolution of the video stream.

In one example of the disclosure, a method of generating a video file including coded video content comprises obtaining a plurality of slices of coded video content; encapsulating the plurality of slices of coded video content within a plurality of access units of a video stream, wherein the video stream includes multiple temporal layers; and encapsulating an indicator within a sample description of a file track, wherein the indicator indicates a number of temporal layers of the video stream.

In one example of the disclosure, a method of generating a video file including coded video content comprises obtaining a plurality of slices of coded video content; encapsulating the plurality of slices of coded video content within a plurality of access units of a video stream, wherein the video stream includes multiple temporal layers; and encapsulating the plurality of access units within a plurality of samples in a file track, wherein the file track contains a representation of the assignment of the samples in the track to temporal layers as well as a characteristics description for each of the temporal layers.

In another example of the disclosure, a device comprises a video file creation module configured to obtain a plurality of slices of coded video content, obtain a plurality of parameter sets associated with the plurality of slices of video content, encapsulating the plurality of slices of coded video content within one or more access units of a video stream, encapsulate a first type of parameter set within the one or more access units of the video stream, and encapsulate a second type of parameter set within a sample description, wherein the sample description includes an indicator identifying a number of parameter sets stored within one or more access units of the video stream.

In another example of the disclosure, a device comprises a video file creation module configured to: obtain a plurality of slices of coded video content; obtain a plurality of parameter sets associated with the plurality of slices of video content; and encapsulate a plurality of parameter sets within a sample description of the file track, wherein parameter set network abstraction layer units correspond to a type of parameter set are included in a dedicated array in the sample description.

In another example of the disclosure, a device comprises a video file creation module configured to: obtain a plurality of slices of coded video content; encapsulate the plurality of slices of coded video content within a plurality of access units of a video stream; obtain a plurality of stream properties associated with the video stream; and encapsulate a stream properties within a sample description of a file track, wherein the stream properties include at least one of a frame rate and a spatial resolution of the video stream.

In another example of the disclosure, a device comprises a video file creation module configured to: obtain a plurality of slices of coded video content; encapsulate the plurality of slices of coded video content within a plurality of access units of a video stream, wherein the video stream includes multiple temporal layers; and encapsulate an indicator within a sample description of a file track, wherein the indicator indicates a number of temporal layers of the video stream.

In another example of the disclosure, a device comprises a video file creation module configured to: obtain a plurality of slices of coded video content; encapsulate the plurality of slices of coded video content within a plurality of access units of a video stream, wherein the video stream includes multiple temporal layers; and encapsulate the plurality of access units within a plurality of samples in a file track, wherein the file track contains a representation of the assignment of the samples in the track to temporal layers as well as a characteristics description for each of the temporal layers.

In another example of the disclosure, a non-transitory computer-readable storage medium has instructions stored thereon that upon execution cause one or more processors of a video coding device to: obtain a plurality of slices of coded video content, obtain a plurality of parameter sets associated with the plurality of slices of video content, encapsulating the plurality of slices of coded video content within one or more access units of a video stream, encapsulate a first type of parameter set within the one or more access units of the video stream, and encapsulate a second type of parameter set within a sample description, wherein the sample description includes an indicator identifying a number of parameter sets stored within one or more access units of the video stream.

In another example of the disclosure, a non-transitory computer-readable storage medium has instructions stored thereon that upon execution cause one or more processors of a video coding device to: obtain a plurality of slices of coded video content; obtain a plurality of parameter sets associated with the plurality of slices of video content; and encapsulate a plurality of parameter sets within a sample description of the file track, wherein parameter set network abstraction layer units correspond to a type of parameter set are included in a dedicated array in the sample description.

In another example of the disclosure, a non-transitory computer-readable storage medium has instructions stored thereon that upon execution cause one or more processors of a video coding device to: obtain a plurality of slices of coded video content; encapsulate the plurality of slices of coded video content within a plurality of access units of a video stream; obtain a plurality of stream properties associated with the video stream; and encapsulate a stream properties within a sample description of a file track, wherein the stream properties include at least one of a frame rate and a spatial resolution of the video stream.

In another example of the disclosure, a non-transitory computer-readable storage medium has instructions stored thereon that upon execution cause one or more processors of a video coding device to: obtain a plurality of slices of coded video content; encapsulate the plurality of slices of coded video content within a plurality of access units of a video stream, wherein the video stream includes multiple temporal layers; and encapsulate an indicator within a sample description of a file track, wherein the indicator indicates a number of temporal layers of the video stream.

In another example of the disclosure, a non-transitory computer-readable storage medium has instructions stored thereon that upon execution cause one or more processors of a video coding device to: obtain a plurality of slices of coded video content; encapsulate the plurality of slices of coded video content within a plurality of access units of a video stream, wherein the video stream includes multiple temporal layers; and encapsulate the plurality of access units within a plurality of samples in a file track, wherein the file track contains a representation of the assignment of the samples in the track to temporal layers as well as a characteristics description for each of the temporal layers.

In another example of the disclosure, an apparatus configured to generate a video file including coded video content comprises means for obtaining a plurality of slices of coded video content; means for obtaining a plurality of parameter sets associated with the plurality of slices of video content; means for encapsulating the plurality of slices of coded video content within one or more access units of a video stream; means for encapsulating a first type of parameter set within the one or more access units of the video stream; and means for encapsulating a second type of parameter set within a sample description, wherein the sample description includes an indicator identifying a number of parameter sets stored within one or more access units of the video stream.

In another example of the disclosure, an apparatus configured to generate a video file including coded video content comprises means for obtaining a plurality of slices of coded video content; means for obtaining a plurality of parameter sets associated with the plurality of slices of video content; and means for encapsulating a plurality of parameter sets within a sample description of the file track, wherein parameter set network abstraction layer units correspond to a type of parameter set are included in a dedicated array in the sample description.

In another example of the disclosure, an apparatus configured to generate a video file including coded video content comprises means for obtaining a plurality of slices of coded video content; means for encapsulating the plurality of slices of coded video content within a plurality of access units of a video stream; means for obtaining a plurality of stream properties associated with the video stream; and means for encapsulating a stream properties within a sample description of a file track, wherein the stream properties include at least one of a frame rate and a spatial resolution of the video stream.

In another example of the disclosure, an apparatus configured to generate a video file including coded video content comprises means for obtaining a plurality of slices of coded video content; means for encapsulating the plurality of slices of coded video content within a plurality of access units of a video stream, wherein the video stream includes multiple temporal layers; and means for encapsulating an indicator within a sample description of a file track, wherein the indicator indicates a number of temporal layers of the video stream.

In another example of the disclosure, an apparatus configured to generate a video file including coded video content comprises means for obtaining a plurality of slices of coded video content; means for encapsulating the plurality of slices of coded video content within a plurality of access units of a video stream, wherein the video stream includes multiple temporal layers; and means for encapsulating the plurality of access units within a plurality of samples in a file track, wherein the file track contains a representation of the assignment of the samples in the track to temporal layers as well as a characteristics description for each of the temporal layers.

In another example of the disclosure, a method of processing a video file including coded video content comprises obtaining a file track including a plurality of samples; decapsulating a plurality of access units from the plurality of samples of a video stream in the file track; decapsulating a plurality of slices of coded video content from the plurality of access units; and decapsulating a plurality of parameter sets associated with the plurality of slices of video content from the plurality of samples.

In another example of the disclosure, a method of processing a video file including coded video content comprises obtaining a file track, wherein the file track includes a plurality of slices of coded video content; and decapsulating a plurality of parameter sets associated with the plurality of slices of video from a sample description of the file track, wherein parameter set network abstraction layer units correspond to a type of parameter set are included in a dedicated array in the sample description.

In another example of the disclosure, a method of processing a video file including coded video content comprises obtaining a file track, wherein the file track includes a plurality of slices of coded video content included a video stream; and obtaining a plurality of stream properties associated with the video stream from a sample description of the file track, wherein the stream properties include at least one of a frame rate and a spatial resolution of the video stream.

In another example of the disclosure, a method of processing a video file including coded video content comprises decapsulating a plurality of slices of coded video content from a plurality of access units of a video stream, wherein the video stream includes multiple temporal layers; and obtaining an indicator within a sample description of a file track, wherein the indicator indicates a number of temporal layers of the video stream.

In another example of the disclosure, a method of processing a video file including coded video content comprises decapsulating a plurality of access units from a plurality of samples in a file track, wherein the file track contains a representation of the assignment of the samples in the track to temporal layers as well as a characteristics description for each of the temporal layers; and decapsulating a plurality of slices of coded video content from a plurality of access units of a video stream, wherein the video stream includes multiple temporal layers.

In another example of the disclosure, a device comprises a processor configured to: obtain a file track including a plurality of samples; decapsulate a plurality of access units from the plurality of samples of a video stream in the file track; decapsulate a plurality of slices of coded video content from the plurality of access units; and decapsulate a plurality of parameter sets associated with the plurality of slices of video content from the plurality of samples.

In another example of the disclosure, a device comprises a processor configured to: obtain a file track, wherein the file track includes a plurality of slices of coded video content; and decapsulate a plurality of parameter sets associated with the plurality of slices of video from a sample description of the file track, wherein parameter set network abstraction layer units correspond to a type of parameter set are included in a dedicated array in the sample description.

In another example of the disclosure, a device comprises a processor configured to: obtain a file track, wherein the file track includes a plurality of slices of coded video content included a video stream; and obtain a plurality of stream properties associated with the video stream from a sample description of the file track, wherein the stream properties include at least one of a frame rate and a spatial resolution of the video stream.

In another example of the disclosure, a device comprises a processor configured to decapsulate a plurality of slices of coded video content from a plurality of access units of a video stream, wherein the video stream includes multiple temporal layers; and obtain an indicator from a sample description of a file track, wherein the indicator indicates a number of temporal layers of the video stream.

In another example of the disclosure, a device comprises a processor configured to: decapsulate a plurality of access units from a plurality of samples in a file track, wherein the file track contains a representation of the assignment of the samples in the track to temporal layers as well as a characteristics description for each of the temporal layers; and decapsulate a plurality of slices of coded video content from a plurality of access units of a video stream, wherein the video stream includes multiple temporal layers.

In another example of the disclosure, a non-transitory computer-readable storage medium has instructions stored thereon that upon execution cause one or more processors of a video coding device to: obtain a file track including a plurality of samples; decapsulate a plurality of access units from the plurality of samples of a video stream in the file track; decapsulate a plurality of slices of coded video content from the plurality of access units; and decapsulate a plurality of parameter sets associated with the plurality of slices of video content from the plurality of samples.

In another example of the disclosure, a non-transitory computer-readable storage medium has instructions stored thereon that upon execution cause one or more processors of a video coding device to: obtain a file track, wherein the file track includes a plurality of slices of coded video content; and decapsulate a plurality of parameter sets associated with the plurality of slices of video from a sample description of the file track, wherein parameter set network abstraction layer units correspond to a type of parameter set are included in a dedicated array in the sample description.

In another example of the disclosure, a non-transitory computer-readable storage medium has instructions stored thereon that upon execution cause one or more processors of a video coding device to: obtain a file track, wherein the file track includes a plurality of slices of coded video content included a video stream; and obtain a plurality of stream properties associated with the video stream from a sample description of the file track, wherein the stream properties include at least one of a frame rate and a spatial resolution of the video stream.

In another example of the disclosure, a non-transitory computer-readable storage medium has instructions stored thereon that upon execution cause one or more processors of a video coding device to: decapsulate a plurality of slices of coded video content from a plurality of access units of a video stream, wherein the video stream includes multiple temporal layers; and obtain an indicator from a sample description of a file track, wherein the indicator indicates a number of temporal layers of the video stream.

In another example of the disclosure, a non-transitory computer-readable storage medium has instructions stored thereon that upon execution cause one or more processors of a video coding device to: decapsulate a plurality of access units from a plurality of samples in a file track, wherein the file track contains a representation of the assignment of the samples in the track to temporal layers as well as a characteristics description for each of the temporal layers; and decapsulate a plurality of slices of coded video content from a plurality of access units of a video stream, wherein the video stream includes multiple temporal layers.

In another example, an apparatus configured to process a video file including coded video content comprises means for obtaining a file track including a plurality of samples; means for decapsulating a plurality of access units from the plurality of samples of a video stream in the file track; means for decapsulating a plurality of slices of coded video content from the plurality of access units; and means for decapsulating a plurality of parameter sets associated with the plurality of slices of video content from the plurality of samples.

In another example, an apparatus configured to process a video file including coded video content comprises means for obtaining a file track, wherein the file track includes a plurality of slices of coded video content; and means for decapsulating a plurality of parameter sets associated with the plurality of slices of video from a sample description of the file track, wherein parameter set network abstraction layer units correspond to a type of parameter set are included in a dedicated array in the sample description.

In another example, an apparatus configured to process a video file including coded video content comprises means for obtaining a file track, wherein the file track includes a plurality of slices of coded video content included a video stream; and means for obtaining a plurality of stream properties associated with the video stream from a sample description of the file track, wherein the stream properties include at least one of a frame rate and a spatial resolution of the video stream.

In another example, an apparatus configured to process a video file including coded video content comprises means for decapsulating a plurality of slices of coded video content from a plurality of access units of a video stream, wherein the video stream includes multiple temporal layers; and means for obtaining an indicator within a sample description of a file track, wherein the indicator indicates a number of temporal layers of the video stream.

In another example, an apparatus configured to process a video file including coded video content comprises means for decapsulating a plurality of access units from a plurality of samples in a file track, wherein the file track contains a representation of the assignment of the samples in the track to temporal layers as well as a characteristics description for each of the temporal layers; and means for decapsulating a plurality of slices of coded video content from a plurality of access units of a video stream, wherein the video stream includes multiple temporal layers.

The details of one or more examples are set forth in the accompanying drawings and the description below. Other features, objects, and advantages will be apparent from the description and drawings, and from the claims.

BRIEF DESCRIPTION OF DRAWINGS

FIG. 2 illustrates an example of an HEVC access unit which may be included in a media file generated according to the techniques described in this disclosure.

DETAILED DESCRIPTION

Figure 1:
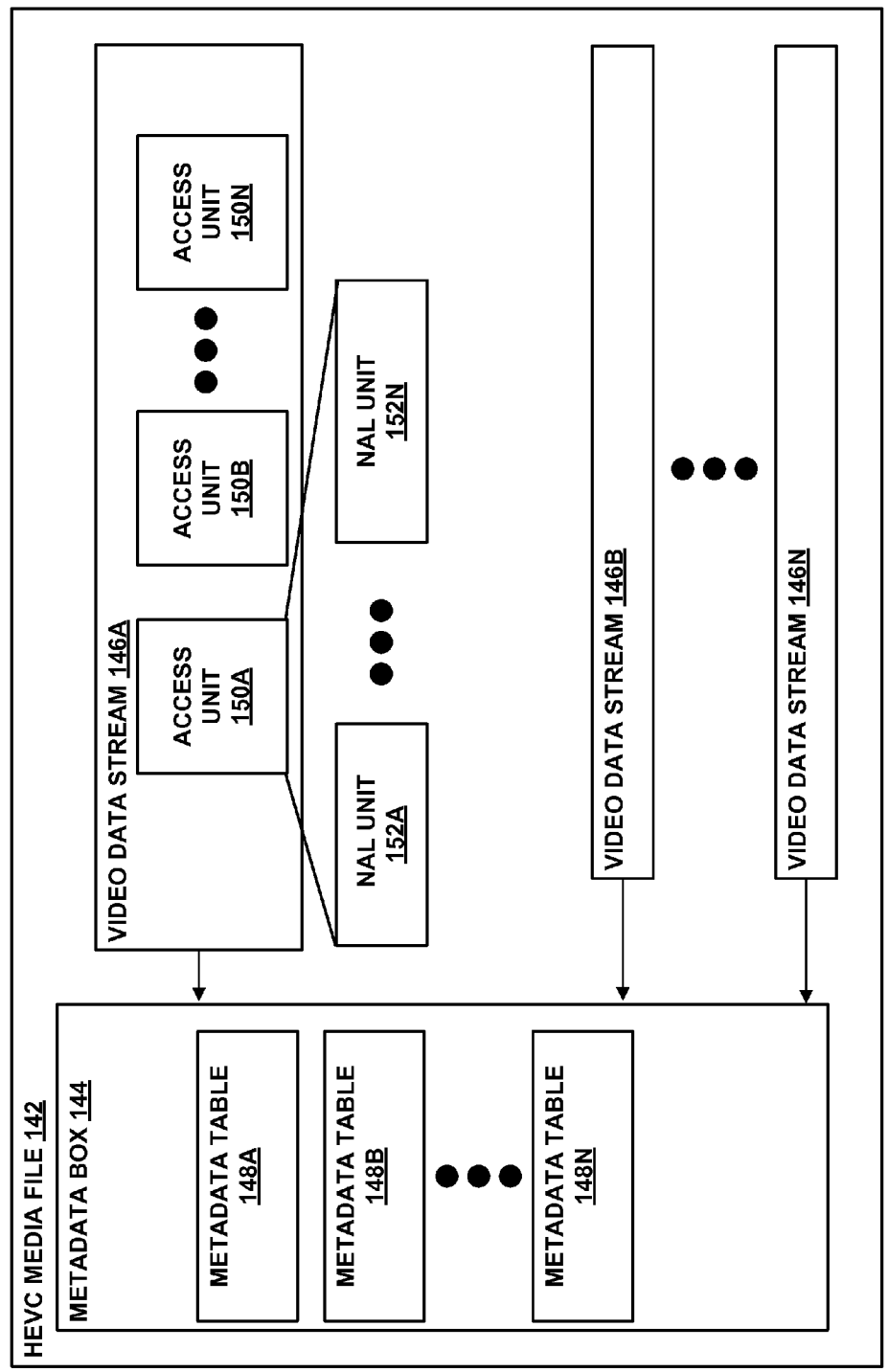
FIG. 1 is a conceptual diagram illustrating the structure of an example media file that may be generated according to the techniques described in this disclosure.

In general, this disclosure relates to coding video and storing coded video content in a file. This disclosure describes various techniques for storing video content including, for example, storing video content coded according to the HEVC video standard in a file based on an ISO based media file format (ISOBMFF). In particular, this disclosure describes techniques for encapsulating Sequence Parameter Sets (SPS), Picture Parameter Sets (PPS), and Adaptive Parameter Sets (APS) included in HEVC video content in a media file. In the case where all parameter sets can be known at the beginning of the file and none need to be updated (i.e., in some cases parameters sets with the same parameter set ID are updated to include different content), the parameter sets may be included in the sample description, which enables out-of-band parameter transmission. In the case where all parameter sets cannot be known at the beginning of the file, or at least one needs to be updated, parameters sets may be included in the samples of the stream, or alternatively, the stream may be split into multiple sub-streams, for each of which the parameter sets may be included in a corresponding sample description. By allowing parameter sets to either be included in the sample description or in the samples of the stream to which the sample description applies, no additional tracks are needed for storing just the parameter sets, and a video file creation module is free to trade off among the number of sample descriptions with the possibility of out-of-band parameter set transmission.

Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, there is a new video coding standard, namely High-Efficiency Video Coding (HEVC), being developed by the Joint Collaboration Team on Video Coding (JCT-VC) of ITU-T Video Coding Experts Group (VCEG) and ISO/IEC Motion Picture Experts Group (MPEG). A recent working Draft (WD) of HEVC, referred to as "HEVC Working Draft 5" or "WD5," is described in document JCTVC-G1103, Bross et al., "WD5: Working Draft 5 of High efficiency video coding (HEVC)," Joint Collaborative Team on Video Coding (JCT-VC) of ITU-T SG16 WP3 and ISO/IEC JTC1/SC29/WG11, 7th Meeting: Geneva, CH, November, 2012. Further, another recent working draft of HEVC, Working Draft 7, is described in document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012. The HEVC standard may also be referred to as ISO/IEC 23008-HEVC, which is intended to be the standard number for the delivered version of HEVC.

To store video content coded according to a particular video standard a file format specification corresponding to the particular video standard is needed. The latest draft of the HEVC file format uses the ISOBMFF as the basis for its encapsulation format. The latest draft of the HEVC file format, referred to herein as, HEVCFF is defined according to ISO/IEC 14496-15:2010/Amd.1:2011(E) and includes the following normative references:
(1) ISO/IEC 14496-1:2001, Information technology—Coding of audio-visual objects—Part 1: Systems;
(2) ISO/IEC 23008-HEVC; and
(3) ISO/IEC 14496-12, Information Technology—Coding of audio-visual objects—Part 12: ISO based media file format (i.e., ISOBMFF)
each of which are incorporated by reference in their entirety.

It should be noted that ISO/IEC 14496-12 is technically identical to ISO/IEC 15444-12. The ISOBMFF is used as the basis for many video coding standard encapsulation formats, as well as for many multimedia container formats. Examples of other file formats based on the ISOBMFF, include, for example, the MPEG-4 file format (ISO/IEC 14496-14), the 3GPP file format (3GPP TS 26.244) and AVC file format (ISO/IEC 14496-15) (i.e., AVCFF). Further, it should be noted that although the techniques disclosed herein are described in some examples with respect to HEVC and may reference particular file formats, they may be equally applicable to other video coding standards and file formats.

Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams. In general, the ISOBMFF allows continuous media data, such as audio and video data, to be stored independently from metadata. In one example, media data may include a group of pictures coded according to HEVC. Metadata typically includes presentation and timing information such that portions of media data are independently decodable.

ISOBMFF uses an object-oriented based scheme in which elementary syntax elements are used as building blocks to form a media file. In ISOBMFF these elementary syntax elements are referred to as "boxes." However, specific file formats based on ISOBMFF may refer to boxes using different terminology, such as "atoms." Further, it should be noted, that when describing specific file formats based on ISOBMFF, specific terminology may often be used interchangeably with ISOBMFF terminology in a non-limiting manner. For example, when describing HEVCFF the term "access unit" may correspond to the term "sample" in the ISOBMFF and an access unit may be described using either term. In ISOBMFF, a box includes a four-character type, the byte count of the box, and the payload. The box type defines the logical relationship between a particular box and other types of boxes. The box type may also describe what data is mandatory for the particular box type and what data is optional for the particular box type. A box may be part of a sequence or group of boxes and may contain other boxes, which may be referred to as sub-boxes.

In ISOBMFF, a Movie box ("moov") contains the metadata for the continuous media streams present in the file. The metadata for the continuous media streams present in the file may be further enclosed within further boxes in the movie box. Continuous media streams may be represented in an ISOMBFF file as a track, where a track is a logical structure that references metadata which may be enclosed within the movie box and wherein the media stream consists of a sequence of samples. In ISOBMFF, a media stream may be enclosed within boxes, such as a Media Data box ("mdat") and sub-boxes thereof. Further, in some examples a media stream may be stored directly in an ISOBMFF file. The media content for a track consists of a sequence of samples, such as video access units. A sequence of samples may be referred to as a stream. The ISOBMFF specifies a media track that contains an elementary media stream. The metadata for each track includes a list of sample description entries, each providing the coding or encapsulation format used in the track and the initialization data needed for processing that format. Each sample is associated with one of the sample description entries of the track. Some file types based on ISOBMFF also include hint tracks. Hint tracks include information that facilitates the reconstruction of media content such that quality and reliability are improved when media content is streamed over a network.

Similar to a file stored according to ISOBMFF, an HEVC file may include a series of elementary streams that reference metadata. In the HEVCFF a sample may be referred to as an access unit as defined in ISO/IEC 23008-HEVC. In the HEVCFF, metadata may also be included in sample description entries. The HEVCFF may allow for hinting, but it should be noted that what the hint tracks refers to as "B frames" in some file formats may actually be "disposable" pictures or non-reference pictures as defined in ISO/IEC 23008-HEVC. Further, a file format used for the storage of HEVC video content may use the existing capabilities of the ISOBMFF, but also may define extensions to support specific HEVC coded video content features such as: parameter sets, temporal scalability, and random access recovery point.

The term parameter sets may refer to a sequence parameter set, a picture parameter set, or an adaptation parameter set, as defined in ISO/IEC 23008-HEVC. Sequence and picture parameter set mechanisms may decouple the transmission of infrequently changing information from the transmission of coded block data. According to HEVC, each slice containing coded block data may reference a picture parameter set containing its decoding parameters. Further, a picture parameter set may reference a sequence parameter set that contains sequence level decoding parameter information. In addition, HEVC also supports adaptation parameter sets. Adaptation parameter sets may contain decoding parameters that are expected to change more frequently than coding parameters in picture parameter sets. An adaptation parameter set may also be referenced by a slice, when needed. It should be noted that AVC does not currently support adaptation parameter sets.

HEVCFF may support temporal scalability sample grouping by including a structuring and grouping mechanism to indicate the association of access units with different hierarchy levels of temporal scalability. Temporal scalability generally allows coded video content to be played back at various frame rates (e.g., 30 frames per second (fps) or 60 fps) at various bitrates. In one example, an HEVC video track may contain zero or one instance of a SampleToGroupBox with a grouping_type 'tscl'. This SampleToGroupBox instance may represent the assignment of samples in the track to temporal layers. An accompanying instance of the SampleGroupDescriptionBox with the same grouping type may, if present, contain TemporalLayerEntry sample group entries describing the temporal layers. Thus, a temporal layer sample group entry may be defined in the HEVCFF as Group type: 'tscl'; Container: Sample Group Description Box ('sgpd'); Mandatory: No; and Quantity: zero or more sample.

In some cases, a temporal layer sample group entry may define the temporal layer information for all samples in a temporal layer. Temporal layers may be numbered with non-negative integers, each temporal layer may be associated with a particular value of temporal_id as defined in ISO/IEC 23008-HEVC. In one example, a temporal layer associated with a temporal_id value greater than 0 may depend on all temporal layers associated with lesser temporal_id values. A temporal layer representation (which may also be referred to as the representation of a temporal layer) associated with a particular temporal_id value may consist of all temporal layers associated with temporal_id values equal to or greater than the particular temporal_id value.

The following is an example of syntax which may be used for a temporal layer entry:

```
class TemporalLayerEntry( ) extends
VisualSampleGroupEntry ('tscl')
{
    unsigned int(8) temporalLayerId;
    unsigned int(8) tlProfileIndication;
    unsigned int(8) tlProfileCompatibility;
    unsigned int(8) tlLevelIndication;
    unsigned int(16) tlMaxBitRate;
    unsigned int(16) tlAvgBitRate;
    unsigned int(8) tlConstantFrameRate;
    unsigned int(16) tlAvgFrameRate;
}
```

In the example temporal layer entry syntax above, the semantics may be defined as follows:
temporalLayerId may give the ID of the temporal layer. In some examples, for all samples that are members of this sample group, the Video coding layer (VCL) network abstraction layer (NAL) units (VCL NAL units are described in further detail below) shall have temporal_id, as defined in ISO/IEC 23008-HEVC, equal to temporalLayerId.
tlProfileIndication may contain the profile code (profile_idc) as defined in ISO/IEC 23008-HEVC, for the representation of the temporal layer identified by temporalLayerId.
tlProfileCompatibility may be a byte defined exactly the same as the byte which occurs between the profile_idc and level_idc in an SPS, as defined in ISO/IEC 23008-HEVC, for the representation of the temporal layer identified by temporalLayerId.
LevelIndication may contain the level code (level_idc) as defined in ISO/IEC 23008-10, for the representation of the temporal layer identified by temporalLayerId.
tlMaxBitrate may give the maximum rate in 1000 bits per second over any window of one second, for the representation of the temporal layer identified by temporalLayerId.
tlAvgBitRate may give the average bit rate in units of 1000 bits per second, for the representation of the temporal layer identified by temporalLayerId.
tlConstantFrameRate may equal to 1 indicate that the representation of the temporal layer identified by temporalLayerId is of constant frame rate. Value zero may indicate that the representation of the temporal layer identified by temporalLayerId may or may not be of constant frame rate.
tlAvgFrameRate may give the average frame rate in units of frames/(256 seconds), for the representation of the temporal layer identified by temporalLayerId.

In addition to temporal scalability sample grouping, the working draft of HEVC also includes the concept of a "gradual decoding refresh" or random access recovery point. The random access recovery point may be signaled in the bit-stream using the recovery point Supplemental Enhancement Information (SEI) message. This message may be found at the beginning of the random access, and may indicate how much data must be decoded subsequent to the access unit at the position of the SEI message before the recovery is complete. The concept of gradual recovery is supported in the HEVCFF by using the sample grouping of type "roll" as defined in ISO/IEC 14496-12. The group membership may mark the sample containing the SEI message such that the "roll-distance" is constrained to being only positive (i.e., a post-roll). It should be noted that the way the roll-group counts samples in the file format may not match the way that the distances are represented in the SEI message. Thus, within a stream, it may be necessary to mark the beginning of the pre-roll, so that a stream decoder may start decoding from there. However, in a file, when performing random access, a deterministic search may be desired for the closest preceding frame which can be decoded perfectly (e.g., either a sync sample, or the end of a pre-roll).

FIG. 1 is a conceptual diagram illustrating the structure of an example HEVC media file based on the ISOBMFF and the current HEVCFF. It should be noted that the example HEVC media file 142 in FIG. 1 is intended to illustrate the logical relationship between video data streams and metadata. For the sake of brevity, the complete encapsulation structure of the HEVC media file 142 has not been illustrated. However, HEVC media file 142 may utilize boxes and encapsulation structures defined according to HEVCFF. In the example illustrated in FIG. 1, HEVC media file 142 includes a metadata box 144 and video data streams 146A-146N. Metadata box 144 may be similar to an ISOBMFF 'moov' box and may contain metadata for each of video data streams 146A-146N. In one example, metadata may be included within metadata tables 148A-148N. Metadata tables 148A-148N may include sample entries which correspond to video data streams 146A-146N. One example of a metadata table is a sample table box. Each of video data streams 146A-146N may reference one or more of metadata tables 148A-148N.

Video data streams 146A-146N may correspond to the video or visual tracks described in ISOBMFF. Thus, video data streams 146A-146N may therefore may use: (1) a handler_type of 'vide' in the HandlerBox; (2) a video media header 'vmhd'; and (3) a derivative of the VisualSampleEntry 'vmhd'. A video stream may be represented by one video track in HEVC media file 142. Each of video data streams 146A-146N may include one or more access units 150A-150N. Access units 150A-150N in the HEVC media file 142 may be defined according to HEVCFF. Access units 150A-150N may correspond to a sample in ISOBMFF. Access units 150A-150N may be externally framed and have a size supplied by that external framing. In some cases, metadata box 144 may include information that defines the size of access units 150A-150N. Access units 150A-150N may include a set of NAL (i.e., Network Abstraction Layer) units 152A-152N. NAL units 152A-152N may be defined according to HEVCFF.

Each NAL unit 152A-152N may include a length field that indicates the length of the NAL unit in bytes. In some examples, the length field can be configured to be one, two, or four bytes. Length fields enable easy scanning of NAL units within an access unit. NAL units 152A-152N may contain NAL unit data as specified in ISO/IEC 23008-HEVC. In addition to other types of NAL units, HEVCFF defines the following types of NAL units: Video data NAL units, which may be referred to as VCL NAL units, Supplemental Enhancement Information (SEI) NAL units, and Access unit (AU) delimiter NAL units, as well as other types of NAL units. It should be noted that NAL unit types that are reserved in ISO/IEC 23008-HEVC may acquire a definition in the future. Some file readers may be configured to ignore NAL units with reserved values of NAL unit type when they are present in these arrays. It should be noted that this 'tolerant' behavior is designed so that errors are not raised, allowing the possibility of backwards-compatible extensions to these arrays in future specifications.

VCL NAL units may be formatted such that all coded slice NAL units for a single picture are contained within the access unit whose decoding time and composition time are those of the picture. Further, access units 150A-150N may be required to contain at least one video data NAL unit.

Video data streams 146A-146N may also be formatted such that all SEI NAL units are contained in the access unit whose decoding time occurs prior to the time at which the SEI messages come into effect. The order of SEI messages within access units 150A-150N may be as defined according to ISO/IEC 23008-HEVC. Further, the HEVC file 142 may require that SEI messages for a picture are included in the access unit containing that picture and that SEI messages pertaining to a sequence of pictures are included in the access unit containing the first picture of the sequence to which the SEI message pertains. Access unit delimiter NAL units may be constrained according to ISO/IEC 23008-HEVC. HEVC file 142 may require that the sequence of NAL units in video data streams 146A-146N and within a single access unit are in arranged in a valid decoding order as specified in ISO/IEC 23008-HEVC.

FIG. 2 illustrates an example of a HEVC access unit including NAL units. As illustrated in FIG. 2, access unit 150 includes an AU delimiter NAL unit, a SEI NAL unit, and two slice NAL units. Further, it should be noted that the HEVCFF may support the concept of sub-samples described in ISOMBFF. A sub-sample is defined as one or more contiguous NAL units within a sample and having the same value of the following fields: RefPicFlag and VclNalUnitFlag. In the example access unit 150 illustrated in FIG. 2, the two slice NAL units may form a sub-sample. An example of a sub-sample information box which may be used for an HEVC stream is described in Section 8.7.7 of ISO/IEC 14496-12. A sub-sample may include multiple NAL units and their preceding NAL unit length field(s). When sub-samples are used, the presence of a sub-sample information box may be optional. However, according to HEVCFF, if the sub-sample information box is present in a track containing HEVC data, the subsample_priority field may be required to be set to a value in accordance with the specification of this field in ISO/IEC 14496-12. Further, the discardable field may be required to be set to 1 only if this sample can still be decoded if this sub-sample is discarded (e.g., the sub-sample consists of an SEI NAL unit). The reserved field is defined in HEVCFF according to the following example syntax:

```
unsigned int(1) RefPicFlag;
unsigned int(1) VclNalUnitFlag;
unsigned int(30) reserved = 0;
```

In the example syntax above, the semantics may be defined as follows:
RefPicFlag equal to 0 may indicate that all the NAL units in the sub-sample have nal_ref_flag equal to 0. RefPicFlag equal to 1 may indicate that all the NAL units in the sub-sample have nal_ref_flag equal to 1.
VclNalUnitFlag equal to 0 may indicate that all NAL units in the sub-sample are non-VCL NAL units. Value 1 may indicate that all NAL units in the sub-sample are VCL NAL units.

Referring again to FIG. 1, HEVC media file 142 may be formatted such that all timing information is external to video data streams 146A-146N. However, in some examples, HEVC file 142 may include picture timing SEI messages that define presentation or composition timestamps in the video data streams 146A-146N, as the picture timing SEI message may contain information other than timing and may be required for conformance checking. HEVC media file 142 may store all timing information in sample metadata tables 148A-148N. Timing information stored in metadata tables 148A-148N may override any timing provided in video data streams 146A-146N. Further, HEVC media file 142 may be configured such that timing information provided within a stream is ignored by a decoder as it may contradict the timing information provided elsewhere in HEVC media file 142 and further in some cases timing information provided within a stream may not be correct or consistent within itself. It should be noted that timing information constraints may be imposed due to the fact that post-compression editing, combination, or re-timing of a stream at the file format level may invalidate or make inconsistent any embedded timing information present within the stream.

In some examples, HEVC media file 142 may be configured such that access units 150A-150N are stored in decoding order. Thus, if picture reordering is not used and decoding time (DTS) and composition time (CTS) are the same, then presentation is the same as decoding order and only a time-to-sample 'stts' table need be used. It should be noted that any kind of picture may be reordered in HEVC video, not only B-pictures. If decoding time and composition time differ, the composition time-to-sample 'ctts' table may also be used in conjunction with the 'stts' table. In some examples, an access unit may be considered as a sync sample if the VCL NAL units in the access unit indicate that the coded picture contained in the access unit is an instantaneous decoding refresh (IDR) picture.

In some cases, HEVC media file 142 may be configured such that video data streams 146A-146N are required not to include start codes. However, systems that wish to deliver a stream for HEVC media file 142 using start codes may do so by reformatting the video streams 146A-146N to insert start codes. Further, video data may naturally be represented as a variable bit rate in HEVC media file 142 and may be filled for transmission if needed. Thus, HEVC media file 142 may be configured such video data streams 146A-146N are required not to include filler data NAL units and filler data SEI messages. It should be noted that if HEVC media file 142 does not contain filler data NAL units, start codes, zero_byte syntax elements, and/or filler data SEI messages, the bit-stream characteristics of HEVC media file 142 may change with respect to conformance with the Hypothetical Reference Decoder (HRD) when operating the HRD in Constant Bit-Rate (CBR) mode as specified in ISO/IEC 23008-HEVC, Annex C.

Similar to HEVCFF, AVCFF also includes ISO/IEC 14496-1:2001 as a normative reference and AVCFF includes a similar design of the systems interface (also referred to as high-level syntax) as the working draft of HEVC. Thus, some portions of the HEVC media file 142 may be formatted in a similar manner to an AVC file. However, some aspects of the AVCFF may not provide for optimal formatting of HEVC coded video content.

One aspect of the AVCFF is that because parameter sets can either be included in the sample description or in a separate parameter set track, there may be an unnecessary increase in the number of tracks or the number of sample descriptions, where each corresponds to a subset of the entire video stream in a video track. It should be noted that the current HEVCFF does not allow for separate parameter set tracks.

Another aspect of the AVCFF is that different types of parameter sets are bundled together whether they are included in the sample description or a separate parameter set track. Thus, in AVC files that do not use a separate parameter track, it is not possible to include some types of parameter sets in a sample description while excluding others. Thus, in this case, SPS and PPS are both stored in the sample description, although PPS may change more frequently. In this manner, PPS cannot be transmitted independent of SPS.

Another aspect of the AVCFF is that a sample description includes an array for an SPS and another array for PPS. In AVCFF these arrays are also allowed to contain SEI NAL units containing declarative SEI messages. Thus, a file parser would have to check the NAL unit header of each NAL unit included in an SPS or PPS array to determine whether the NAL unit is a parameter set NAL unit or an SEI NAL unit.

Another aspect of the AVC file format is that stream properties like spatial resolution and frame rate which are important for track or stream selection purposes (e.g., in file based adaptive streaming applications) are not allowed to be stored in the sample description and are thus not conveniently accessible with the AVCFF design.

Another aspect of the AVC file format is that temporal scalability properties, such as profile, level, and frame rate, which are important for selection of a particular temporal subset of a stream, are missing for each temporal layer representation.

Figure 3:
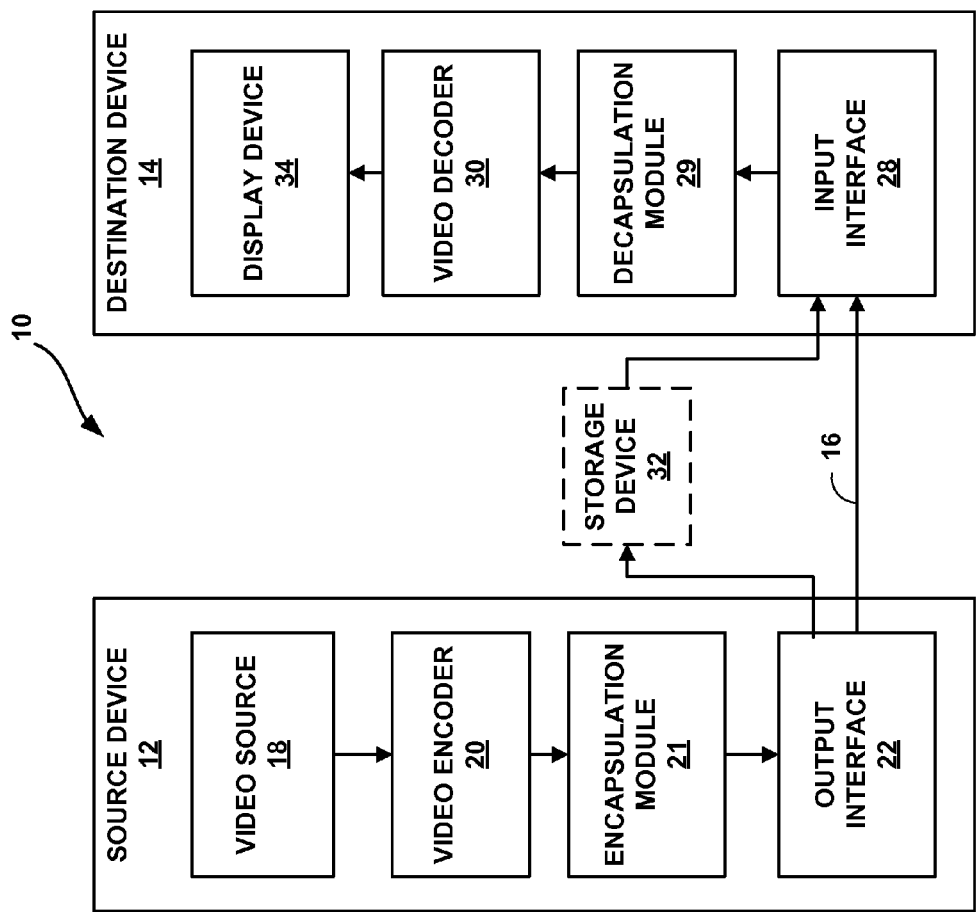
FIG. 3 is a block diagram illustrating an example video coding and transmission system that may utilize the techniques described in this disclosure.

FIG. 3 is a block diagram illustrating an example video coding and transmission system that may utilize the techniques described in this disclosure. In one example system 10 may be configured to encapsulate a PPS within access units of a video stream, wherein the sample description includes an indicator identifying the number of PPS stored within one or more access units of the video stream. As shown in FIG. 3, system 10 includes a source device 12 that generates encoded video data to be decoded at a later time by a destination device 14. Source device 12 and destination device 14 may be configured such that HEVC media file 142, described with respect to FIG. 1 may be generated at source device 12 and transmitted to destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

In the example of FIG. 3, source device 12 includes a video source 18, video encoder 20, encapsulation unit 21, and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. The captured, pre-captured, or computer-generated video may be encoded by video encoder 20. Video encoder 20 may operate according to a video compression standard, such as HEVC and may conform to the HEVC Test Model (HM). Further, video encoder 20 may operate according to other video standards described herein.

For video coding according to the HEVC, a video frame may be partitioned into coding units. A coding unit (CU) generally refers to an image region that serves as a basic unit to which various coding tools are applied for video compression. A CU usually has a luminance component, denoted as Y, and two chroma components, denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as AVC. Coding according to some of the presently proposed aspects of the developing HEVC standard will be described in this application for purposes of illustration. However, the techniques described in this disclosure may be useful for other video coding processes, such as those defined according to AVC or other standard or proprietary video coding processes. HEVC standardization efforts are based on a model of a video coding device referred to as the HEVC Test Model (HM). The HM presumes several capabilities of video coding devices over devices according to, e.g., ITU-T H.264/AVC. For example, whereas AVC provides nine intra-prediction encoding modes, HM provides as many as thirty-four intra-prediction encoding modes.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may include one or more TUs or PUs that correspond to a coding node within a CU. The video blocks may have fixed or varying sizes, and may differ in size according to a specified coding standard.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block" or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

Moreover, TUs of leaf-CUs may also be associated with respective quadtree data structures. That is, a leaf-CU may include a quadtree indicating how the leaf-CU is partitioned into TUs. This disclosure refers to the quadtree indicating how an LCU is partitioned as a CU quadtree and the quadtree indicating how a leaf-CU is partitioned into TUs as a TU quadtree. The root node of a TU quadtree generally corresponds to a leaf-CU, while the root node of a CU quadtree generally corresponds to an LCU. TUs of the TU quadtree that are not split are referred to as leaf-TUs.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

To code a block (e.g., a prediction unit of video data), a predictor for the block is first derived. The predictor, also referred to as a predictive block, can be derived either through intra (I) prediction (i.e., spatial prediction) or inter (P or B) prediction (i.e. temporal prediction). Hence, some prediction units may be intra-coded (I) using spatial prediction with respect to reference samples in neighboring reference blocks in the same frame (or slice), and other prediction units may be uni-directionally inter-coded (P) or bi-directionally inter-coded (B) with respect to blocks of reference samples in other previously-coded frames (or slices). In each case, the reference samples may be used to form a predictive block for a block to be coded.

Upon identification of a predictive block, the difference between the original video data block and its predictive block is determined. This difference may be referred to as the prediction residual data, and indicates the pixel differences between the pixel values in the block to be coded and the pixel values in the predictive block selected to represent the coded block. To achieve better compression, the prediction residual data may be transformed, e.g., using a discrete cosine transform (DCT), an integer transform, a Karhunen-Loeve (K-L) transform, or another transform.

The residual data in a transform block, such as a TU, may be arranged in a two-dimensional (2D) array of pixel difference values residing in the spatial, pixel domain. A transform converts the residual pixel values into a two-dimensional array of transform coefficients in a transform domain, such as a frequency domain. For further compression, the transform coefficients may be quantized prior to entropy coding. An entropy coder then applies entropy coding, such as Context Adaptive Variable Length Coding (CAVLC), Context Adaptive Binary Arithmetic Coding (CABAC), Probability Interval Partitioning Entropy Coding (PIPE), or the like, to the quantized transform coefficients.

To entropy code a block of quantized transform coefficients, a scanning process is usually performed so that the two-dimensional (2D) array of quantized transform coefficients in a block is rearranged, according to a particular scan order, into an ordered, one-dimensional (1D) array, i.e., vector, of transform coefficients. Entropy coding is then applied to the vector of transform coefficients. The scan of the quantized transform coefficients in a transform unit serializes the 2D array of transform coefficients for the entropy coder. A significance map may be generated to indicate the positions of significant (i.e., non-zero) coefficients. Scanning may be applied to scan levels of significant (i.e., nonzero) coefficients, and/or to code signs of the significant coefficients.

In HEVC, position information of the significant transform (e.g., the significance map) is first coded for a TU to indicate the location of the last non-zero coefficient in the scan order. The significance map and the level information (the absolute values and signs of the coefficients) are coded for each coefficient in an inverse scan order.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m. In some examples, video encoder 20 may utilize a predefined scan order to scan the quantized transform coefficients to produce a serialized vector that can be entropy encoded. In other examples, video encoder 20 may perform an adaptive scan.

Figure 4:
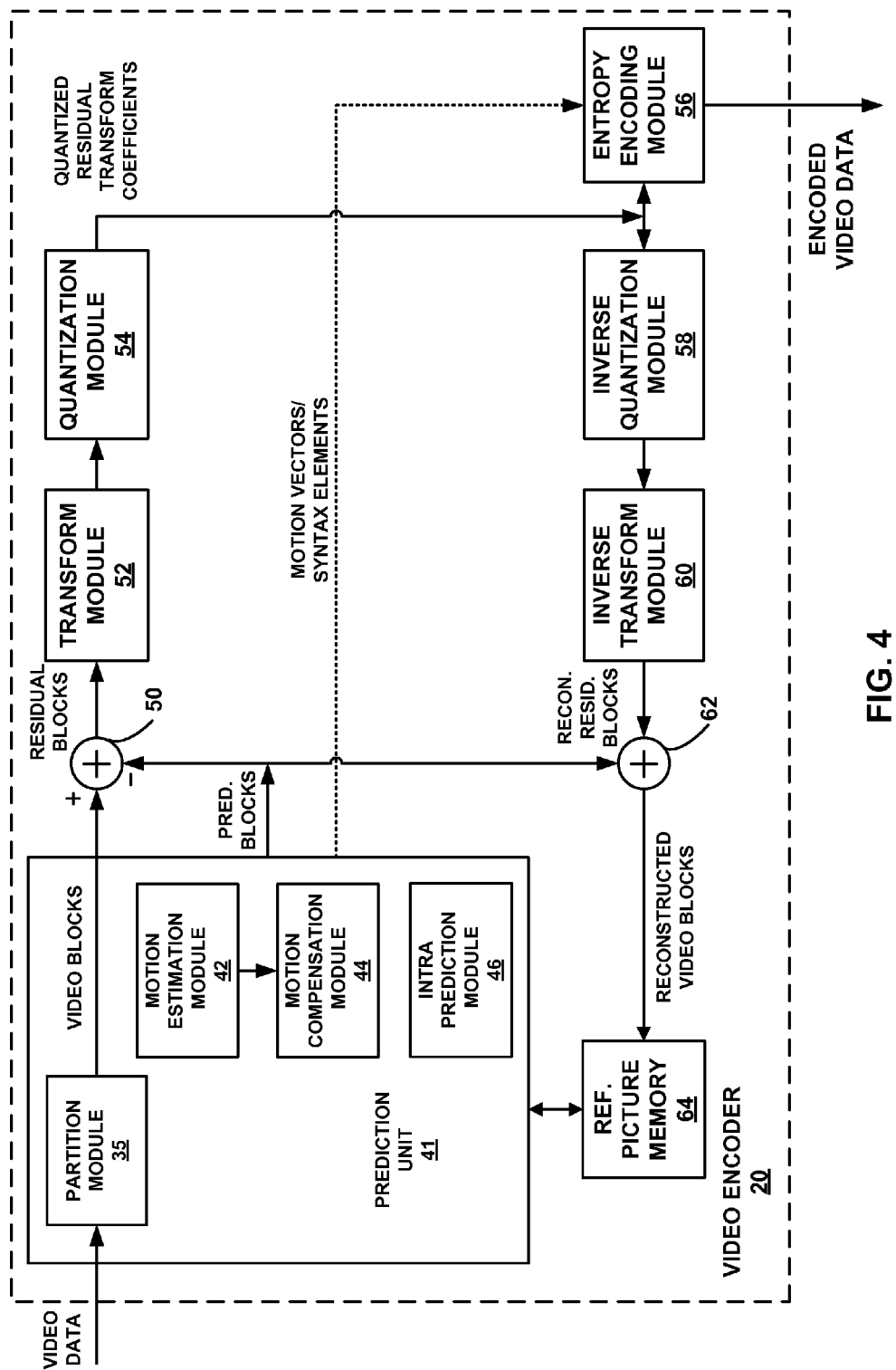
FIG. 4 is a block diagram illustrating an example of a video encoder.

FIG. 4 is a block diagram illustrating an example video encoder 20 that may implement the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 4, video encoder 20 includes a partition module 35, prediction module 41, reference picture memory 64, summer 50, transform module 52, quantization module 54, and entropy encoding module 56. Prediction module 41 includes motion estimation module 42, motion compensation module 44, and intra prediction module 46. Prediction module 41 also may include partition module 35. For video block reconstruction, video encoder 20 also includes inverse quantization module 58, inverse transform module 60, and summer 62. A deblocking filter (not shown in FIG. 4) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 4, video encoder 20 receives video data, and partition module may partition the data into video blocks. This partitioning may also include partitioning video data into slices, tiles, or other larger units, as well as video block partitioning, e.g., according to a residual quadtree structure of LCUs and CUs to produce PU's and TU's. Partition module 35 may partition blocks of video data such as LCU's into sub-blocks such as CU's, PU's and TU's. For example, partition module 35 may partition blocks of video data based on evaluation of previous partitioning schemes in previous coding passes. For example, partition module 35 may initially partition a frame or slice into LCUs, and partition each of the LCUs into sub-CUs based on a rate-distortion analysis (e.g., rate-distortion optimization) in conjunction with prediction module 41. Accordingly, although partition module 35 is shown in FIG. 4 as a separate block for purposes of illustration, the partitioning functions performed by partition module 35 may be integrated with the mode selection and prediction functions of prediction module 41, particularly where the rate-distortion analysis performed by prediction module 41 may be used to determine, at least in part, aspects of the partitioning applied to an LCU to produce CU's, sub-CU's, PU's and TU's. In general, prediction module 41, in conjunction with partition module 35, may produce a quadtree data structure indicative of partitioning of an LCU into sub-CUs. Leaf-node CUs of the quadtree may include one or more PUs and one or more TUs.

Prediction module 41, as represented by partition module 35, may provide various techniques for defining a partitioning scheme for one of the plurality of video components independently of other video components, as described in this disclosure. In another aspect, prediction module 41 may determine whether to define a partitioning scheme for at least one of the plurality of video components of a video block independently of the other video components based on one or more properties of the video block. In some examples, the properties may include at least one of block size, picture type, block partition, or motion information.

Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation module 42 and motion compensation module 44 within prediction module 41 perform inter-predictive coding of the current video block relative to one or more predictive blocks in one or more reference pictures to provide temporal compression.

If inter prediction rather than intra prediction is selected for a current video block, motion estimation module 42 may be configured to determine the inter-prediction mode for a video slice according to a predetermined pattern for a video sequence. The predetermined pattern may designate video slices in the sequence as P slices, B slices or generalized P/B (GPB) slices. Motion estimation module 42 and motion compensation module 44 may be highly integrated, but are illustrated separately for conceptual purposes. Motion estimation, performed by motion estimation module 42, is the process of generating motion vectors, which estimate motion for video blocks. A motion vector, for example, may indicate the displacement of a PU of a video block within a current video frame or picture relative to a predictive block within a reference picture.

In inter-coding, a predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation module 42 may perform a motion search relative to the full pixel positions and fractional pixel positions and output a motion vector with fractional pixel precision.

Motion estimation module 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation module 42 sends the calculated motion vector to entropy encoding module 56 and motion compensation module 44, e.g., along with other syntax elements.

Motion compensation, performed by motion compensation module 44, may involve fetching or generating the predictive block based on the motion vector determined by motion estimation, possibly performing interpolations to sub-pixel precision. Upon receiving the motion vector for the PU of the current video block, motion compensation module 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation module 44 may also generate syntax elements associated with the video blocks and the video slice for use by video decoder 30 in decoding the video blocks of the video slice.

Intra-prediction module 46 may intra-predict a current block, as an alternative to the inter-prediction performed by motion estimation module 42 and motion compensation module 44, as described above. In particular, intra-prediction module 46 may determine an intra-prediction mode to use to encode a current block. In some examples, intra-prediction module 46 may encode a current block to produce a predictive block using various intra-prediction modes, e.g., during separate encoding passes, and intra-prediction module 46 (or mode select module 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

In any case, after selecting an intra-prediction mode for a block, intra-prediction module 46 may provide information indicative of the selected intra-prediction mode for the block to entropy coding module 56. For example, intra-prediction module 46 may provide signaling, such as one or more syntax elements, to indicate a selected intra mode. Entropy coding module 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction module 41 generates the predictive block for the current video block, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization module 54. Quantization module 54 quantizes the transform coefficients to further reduce bit rate. The quantization process may reduce the bit depth associated with some or all of the coefficients. The degree of quantization may be modified by adjusting a quantization parameter. In some examples, quantization module 54 may then perform a scan of the matrix including the quantized transform coefficients. Alternatively, entropy encoding module 56 may perform the scan.

Following quantization, entropy encoding module 56 entropy encodes the quantized transform coefficients. For example, entropy encoding module 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding module 56, the encoded bitstream may be transmitted to video decoder 30, or archived for later transmission or retrieval by video decoder 30. Entropy encoding module 56 may also entropy encode the motion vectors and the other syntax elements for the current video slice being coded.

Inverse quantization module 58 and inverse transform module 60 apply inverse quantization and inverse transformation, respectively, to reconstruct the residual block in the pixel domain for later use as a reference block of a reference picture. Motion compensation module 44 may calculate a reference block by adding the residual block to a predictive block of one of the reference pictures within one of the reference picture lists. Motion compensation module 44 may also apply one or more interpolation filters to the reconstructed residual block to calculate sub-integer pixel values for use in motion estimation. Summer 62 adds the reconstructed residual block to the motion compensated prediction block produced by motion compensation module 44 to produce a reference block for storage in reference picture memory 64. The reference block may be used by motion estimation module 42 and motion compensation module 44 as a reference block to inter-predict a block in a subsequent video frame or picture.

Video encoder 20 of FIG. 4 represents an example of a video encoder configured to output HEVC coded video content, which may include coded samples of video content, parameter sets, and SEI messages. As described above, with respect to HEVC media file 142 illustrated in FIG. 1, the types of parameter sets used with the HEVC video coding standard include SPS, PPS and APS. Each parameter set has an identifier, and each slice coded according to the HEVC standard, as described above, may reference the parameter set it was coded against using the parameter set's identifier.

Referring again to FIG. 3, encapsulation module 21 may receive encoded video content from video encoder 20 and generate a video file according to techniques described herein. In one example, encapsulation module 21 may receive HEVC coded video content and generate a video file using a file format based on the ISOBMFF and the current version of the HEVCFF.

Figure 5:
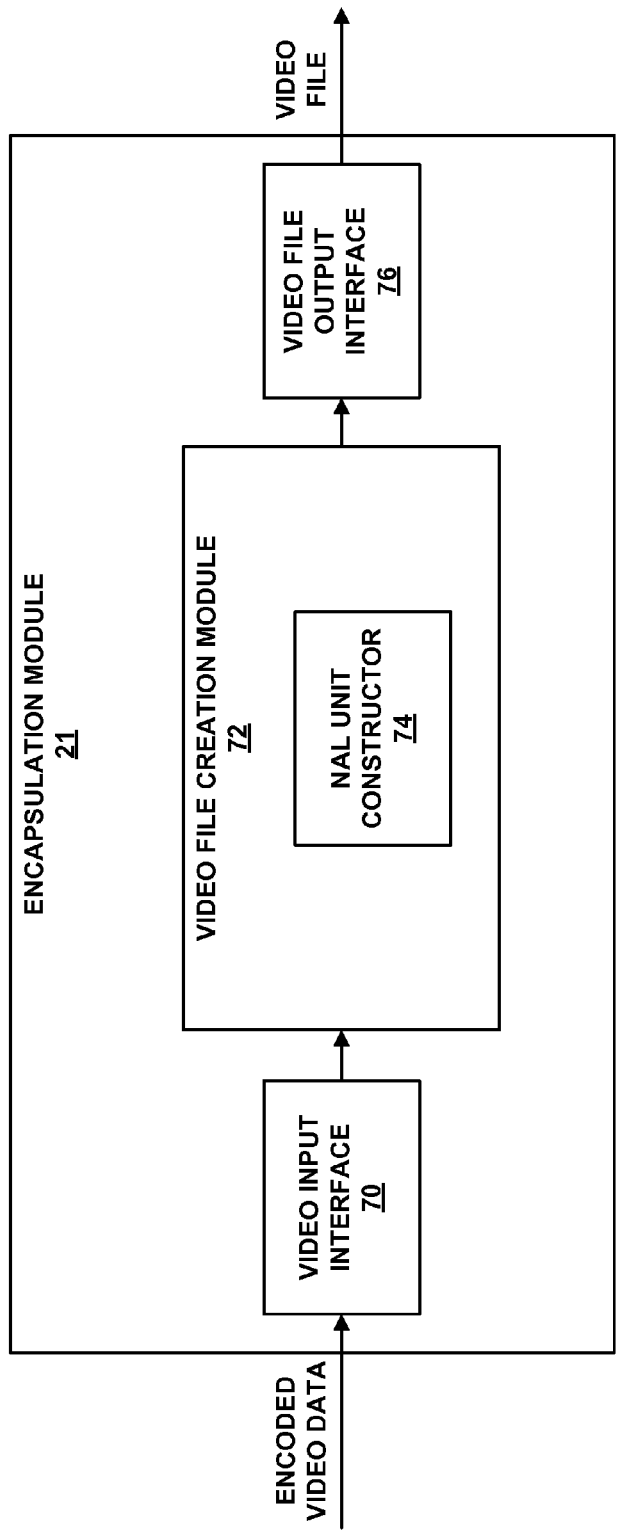
FIG. 5 is a block diagram illustrating an example of an encapsulation module that may implement the techniques described in this disclosure.

FIG. 5 is a block diagram illustrating components of an example encapsulation module 21. In the example of FIG. 5, encapsulation module 21 includes video input interface 70, video file creation module 72, and video file output interface 76. Video file creation module 70, in this example, includes network abstraction layer (NAL) unit constructor 74.

Video input interface 70 may receive coded video content. Video input interface 70 may receive coded video content from video encoder 20 or may retrieve encoded video content from a storage device. Coded video content may be coded according to the HEVC standard and may include samples of video content, parameter sets, and SEI messages. Upon receiving encoded video content, video input interface 70 may output the coded video content to video file creation module 72 for assembly into a video file. In some instances, video input interface 70 may facilitate the assembly of a video file by organizing or buffering coded video content before it is output to video file creation module 72.

In general, video file creation module 72 may generate a video file including the received coded video content. In one example, video file creation module 72 may create a video file, such as, HEVC media file 142 described with respect to FIG. 1. Video file creation module 72 may correspond to a control unit including hardware, software, and/or firmware configured to perform the functions and procedures attributed thereto. The control unit may further perform the functions attributed to encapsulation module 21 generally. For examples in which video file creation module 72 is embodied in software and/or firmware, encapsulation module 21 may include a computer-readable medium comprising instructions for video file creation module 72 and a processing unit to execute the instructions. Sub-modules of video file creation module 72 (NAL unit constructor 74 in this example) may be implemented as individual hardware modules and/or software modules, and may be functionally integrated or further separated into additional sub-modules. Video file creation module 72 may correspond to any suitable processing unit or processing circuitry, such as, for example, one or more microprocessors, application-specific integrated circuits (ASICs), field programmable gate arrays (FPGAs), digital signal processors (DSPs), or any combination thereof. Video file creation module 72 may further include a non-transitory computer-readable medium storing instructions for NAL unit constructor 74, as well as a processor for executing the instructions.

In one example, video file creation module 72 may be configured to output encoded video data according to a file format where parameter sets can either be included in the sample description or in the samples or access units of the stream to which the sample description applies. In one example, if a type of parameter set is included in the sample description it may not also be included within the samples themselves. That is, in this particular example, for a video stream that a particular sample description applies to, a particular type of parameter set, if present, may either be stored in the sample description or in the samples, but never in both. In an alternative example, a type of parameter set may be included in both the sample description and the samples of the stream to which the sample description applies. When parameter sets are allowed to be included in either the sample description or within the samples themselves an indication may be included in the sample description to indicate whether there are parameter sets included in the samples in addition to those included in the sample description. In another example, video file creation module 72 may be configured to output encoded video data according to a file format where only one or more than one particular type of parameter set may be included in both the sample description and the samples of the stream to which the sample description applies. For example, in some instances a file format may allow PPS to be included in both the sample description and samples, whereas SPS may only be allowed to be included in the sample description. Further, in this instance APS may only be allowed to be stored samples. In addition, an indication may be included in the sample description to indicate whether there may be parameter sets of the particular type included in the samples in addition to those included in the sample description.

Further, video file creation module 72 may be configured such that each HEVC sample description, which contains the HEVC video stream decoder specific information, may include a group of the particular type of parameter sets. A group of parameter sets may function much like a codebook. Each parameter set may have an identifier, and each coded slice may reference a parameter set identifier. As defined by a file format, each configuration of parameter sets may be represented separately. According to some file formats, a parameter set cannot be updated without causing a different sample description to be used. In this case, systems wishing to send parameter set updates may need to compare the two configurations to find the differences in order to send the appropriate parameter set updates. It should be noted, that the HEVCFF typically recommends that when several parameter sets are used and parameter set updating is desired, the parameter sets are included in the samples of the stream. It should also be noted that decoders conforming to the HEVCFF may be required to support both parameter sets stored in the samples as well as parameter sets stored in the sample description entries, unless restricted by another file format based on HEVCFF.

In one example, video file creation module 72 may be configured to output encoded video data according to a file format where different types of parameter sets are not bundled together when they are included in the sample description or in the samples of the stream to which the sample description applies. In this example, the inclusion of one type of parameter set in the sample description or the samples may be independent of whether other types of parameter sets are included in the sample description or the samples. In another example, video file creation module may be configured to output encoded video data according to a file format where only a subset of all types of parameter sets are bundled together when it comes to whether they are included in the sample description or in the samples of the stream to which the sample description applies. For example, SPS and PPS may be bundled together, while inclusion of APS in the sample description or in the samples may be independent of inclusion of SPS and PPS in the sample description or in the samples.

In one example, video file creation module 72 may be configured to output encoded video data according to a file format where a sample description includes an array for each type of parameter set, and the array for a particular type of parameter set may only include parameter set NAL units of that particular type. In addition, the sample description may also include an array for SEI NAL units containing declarative SEI messages. Thus, in this case, a file parser does not need to check the NAL unit header of each NAL unit included in an array to determine the type of the NAL unit. In an alternative example, video file creation module 72 may be configured to output encoded video data according to a file format where an array is included in the sample description, and the array may include any type of parameter sets as well as SEI NAL units containing declarative SEI messages.

In one example, video file creation module 72 may be configured to output encoded video data according to a file format where stream properties like spatial resolution and frame rate that are important for track or stream selection purposes (e.g. in file based adaptive streaming applications) are included in the sample description. Further, in another example, video file creation module 72 may be configured to output encoded video data according to a file format where the sample description includes the output bit depth (i.e., the bit depth, possible the same or different for different color components, of the pictures output from video encoder 20). Including stream properties that are important for track or stream selection purposes in the sample description may enable convenient access of these stream properties. In another example, video file creation module 72 may be configured to output encoded video data according to a file format where the sample description includes information on a set of tiles (as defined in HEVC) that is independently decodable from other tiles throughout the stream, e.g., the geometry region covered by the set of tiles.

In one example, video file creation module 72 may be configured to output encoded video data according to a file format where temporal scalability properties such as profile, level, and frame rate, which are important for selection of a particular temporal subset of a stream, are included for each temporal layer representation, through the temporal scalability sample grouping mechanism.

In one example, video file creation module 72 may be configured to store an entire video stream in one track, regardless of how many temporal layers are included in the video stream. In an alternative example, an entire video stream may be stored in more than one track, where each track contains a subset of consecutive temporal layers. In the case where an entire video stream is stored in more than one track, there may be an indication in the file to indicate each track for which the lowest contained temporal layer has a temporal_id, denoted as tId, greater than 0, and to indicate the track that contains the layer with temporal_id equal to tId−1. These tracks may be respectively denoted as track A and track B. Such an indication may be a track reference of type 'tscl' included in track A, where the track reference refers to the track B that the track A depends on. The stream properties of track A may describe that the stream consists of track A and all tracks that collectively contain the temporal layers with temporal_id values less than tId, as if all these temporal layers are also contained in track A. In one example, video file creation module 72 may be configured to perform any and all combinations of the examples described above. For example, video file creation module 72 may be configured output encoded video data according to a file format including any and all combinations of the file formats described herein.

Video file creation module 72 may include decoder configuration information in a decoder information configuration record stored within a file. The decoder information may be defined by the HEVC standard and the decoder configuration record may be based on the decoder configuration record currently defined in the HEVCFF, but may also include additional information consistent with the examples described herein. In this manner, one or more of the example configurations of video file creation module 72 described above may be implemented according to a file format defining decoder configuration information. Decoder configuration information may be included in a decoder configuration record as further described below. Thus, in one example, a sample description as described above may be embodied in a decoder configuration record. It should be noted that although metadata, such as parameter sets and respective indications thereof, is described as being included in a decoder configuration record or in a sample description, this should not be construed as limiting and metadata described above with respective to example configurations of video file creation module 72 may be stored in other portions of a file generated by video file creation module 72, where the other portions of a file generated by video file creation module 72 are distinct from video streams.

In one example, video file creation module 72 may generate a file that includes a decoder configuration record that may contain the size of the length field used in each access unit to indicate the length of an access unit's contained NAL units. Further, in one example, the decoder configuration record generated by video file creation module 72 may also include information regarding parameter sets and declarative SEI NAL units, such as, for example: (1) an indication whether parameter sets are stored in the sample description or within access units (2) the number of parameter sets stored in either a sample description or within access units of a stream; (3) information regarding parameter set NAL units; (4) information regarding declarative SEI NAL units; and/or (5) spatial resolution information.

An example decoder configuration record may be generated by video file creation module 72 according to the following example syntax. It should be noted that the syntax below may be modified in accordance with the other example video file creation module 72 configurations described above.

```
aligned(8) class HEVCDecoderConfigurationRecord {
    unsigned int(8) configurationVersion = 1;
    unsigned int(8) ProfileIndication;
    unsigned int(8) profileCompatibility;
    unsigned int(8) LevelIndication;
    bit(6) reserved = '111111'b;
    unsigned int(2) chromaFormat;
    bit(5) reserved = '111111'b;
    unsigned int(3) bitDepthLumaMinus8;
    bit(5) reserved = '111111'b;
    unsigned int(3) bitDepthChromaMinus8;
    bit(16) pictureWidthInLumaSamples;
    bit(16) pictureHeightInLumaSamples;
    bit(16) avgFrameRate;
    bit(1) constantFrameRate;
    bit(3) numTemporalLayers;
    bit(2) reserved = '11'b;
    unsigned int(2) lengthSizeMinusOne;
    unsigned int(8) numOfSequenceParameterSets;
    for (i=0; i< numOfSequenceParameterSets; i++) {
        unsigned int(16) sequenceParameterSetLength ;
```

```
        bit(8*sequenceParameterSetLength)
        sequenceParameterSetNalUnit;
    }
    unsigned int(8) numOfPictureParameterSets;
    for (i=0; i< numOfPictureParameterSets; i++) {
        unsigned int(16) pictureParameterSetLength;
        bit(8*pictureParameterSetLength) pictureParameterSetNalUnit;
    }
    unsigned int(8) numOfAdaptationParameterSets;
    for (i=0; i< numOfAdaptationParameterSets; i++) {
        unsigned int(16) adaptationParameterSetLength;
        bit(8*adaptationParameterSetLength)
        adaptationParameterSetNALUnit;
    }
    unsigned int(8) numOfDeclarativeSeiNalUnits;
    for (i=0; i< numOfDeclarativeSeiNalUnits; i++) {
        unsigned int(16) declarativeSeiNalUnitLength;
        bit(8*declarativeSeiNalUnitLength) declarativeSeiNalUnit;
    }
}
```

In the example syntax above, the semantics may be defined as follows:

ProfileIndication may contain the profile code (profile_idc) as defined in ISO/IEC 23008-HEVC, for the stream to which this configuration record applies.

profileCompatibility may be a byte defined exactly the same as the byte which occurs between the profile_idc and level_idc in a sequence parameter set (SPS), as defined in ISO/IEC 23008-HEVC, for the stream to which this configuration record applies.

LevelIndication may contain the level code (level_idc) as defined in ISO/IEC 23008-10.

chromaFormat may contain the chroma_format indicator as defined by the chroma_format_idc parameter in ISO/IEC 23008-HEVC, for the stream to which this configuration record applies.

bitDepthLumaMinus8 may contain the luma bit depth indicator as defined by the bit_depth_luma_minus8 parameter in ISO/IEC 23008-HEVC, for the stream to which this configuration record applies.

bitDepthChromaMinus8 may contain the chroma bit depth indicator as defined by the bit_depth_chroma_minus8 in ISO/IEC 23008-HEVC, for the stream to which this configuration record applies.

pictureWidthInLumaPixels may indicate the decoded picture width in units of luma pixels, for the stream to which this configuration record applies.

pictureHeightInLumaPixels may indicate the decoded picture height in units of luma pixels, for the stream to which this configuration record applies.

avgFrameRate may give the average frame rate in units of frames/(256 seconds), for the stream to which this configuration record applies. Value 0 may indicate an unspecified average frame rate.

constantFrameRate equal to 1 may indicate that the stream to which this configuration record applies is of constant frame rate. Value 2 may indicate that the representation of each temporal layer in the stream is of constant frame rate. Value 0 may indicate that the stream may or may not be of constant frame rate.

numTemporalLayers greater than 1 may indicate that the stream to which this configuration record applies is temporally scalable and the contained number of layers is equal to numTemporalLayers. Value 1 may indicate that the stream is not temporally scalable. Value 0 may indicate that it is unknown whether the stream is temporally scalable.

lengthSizeMinusOne plus 1 may indicate the length in bytes of the NALUnitLength field in an HEVC video sample in the stream to which this configuration record applies. For example, a size of one byte may be indicated with a value of 0. The value of this field may be one of 0, 1, or 3 corresponding to a length encoded with 1, 2, or 4 bytes, respectively.

numOfSequenceParameterSets may indicate the number of SPSs that are used for decoding the stream to which this configuration record applies. In one example, if the value is greater than 0, there shall be no SPS included in the samples of the stream. In one example, if the value is equal to 0, there shall be at least one SPS included in the samples of the stream.

sequenceParameterSetLength may indicate the length in bytes of the SPS NAL units, as defined in ISO/IEC 23008-HEVC.

sequenceParameterSetNalUnit may contain an SPS NAL unit, as specified in ISO/IEC 23008-HEVC.

numOfPictureParameterSets may indicate the number of picture parameter sets that are used for decoding the stream to which this configuration record applies. In one example, if the value is greater than 0, there shall be no PPS included in the samples of the stream. In one example, if the value is equal to 0, there shall be at least one PPS included in the samples of the stream.

pictureParameterSetLength may indicate the length in bytes of the PPS NAL unit as defined in ISO/IEC 23008-HEVC.

pictureParameterSetNalUnit may contain a PPS NAL unit, as specified in ISO/IEC 23008-HEVC.

numOfAdaptationParameterSets may indicate the number of adaptation parameter sets (APSs) that are used for decoding the stream to which this configuration record applies. In one example, if the value is greater than 0, there shall be no APS included in the samples of the stream. In one example, if the value is equal to 0, there may or may not be APSs included in the samples of the stream.

adaptationParameterSetLength may indicate the length in bytes of the APS NAL unit as defined in ISO/IEC 23008-HEVC.

adaptationParameterSetNalUnit may contain an APS NAL unit, as specified in ISO/IEC 23008-HEVC.

numOfDeclarativeSeiNalUnits may indicate the number of declarative SEI NAL units for the stream to which this configuration record applies. A declarative SEI NAL unit may contain SEI messages of a 'declarative' nature, that is, those that provide information about the stream as a whole. An example of such an SEI is a user-data SEI.

declarativeSeiNalUnitLength may indicate the length in bytes of the declarative SEI NAL unit.

declarativeSeiNalUnit may contain a declarative SEI NAL unit.

numOfSequenceParameterSetExt may indicate the number of Sequence Parameter Set Extensions that are used for decoding the AVC elementary stream.

sequenceParameterSetExtLength may indicate the length in bytes of the SPS Extension NAL unit as defined in ISO/IEC 14496-10.

sequenceParameterSetExtNALUnit may contain a SPS Extension NAL unit, as specified in ISO/IEC 14496-10.

In addition to the example syntax and semantics described above, a file format used by video creation module 72 may include additional constraints with respect to a decoder configuration record. For example, in some cases, the values for ProfileIndication, LevelIndication, and the flags which indicate profile compatibility must be valid for all parameter sets of the stream described by a decoder configuration record. Further, in some cases, the level indication must indicate a level of capability equal to or greater than the highest level indicated in the included parameter sets and each profile compatibility flag may only be set if all the included parameter sets set that flag. Further, in some cases, the profile indication must indicate a profile to which the stream associated with this configuration record conforms. Further, in some cases, if the sequence parameter sets are marked with different profiles, and the relevant profile compatibility flags are all zero, then the stream may need examination to determine which profile, if any, the entire stream conforms to. Further, if the entire stream is not examined, or the examination reveals that there is no profile to which the entire stream conforms, then the entire stream must be split into two or more sub-streams with separate configuration records in which these rules can be met.

Further, in some examples, an explicit indication can be provided in the decoder configuration record about the chroma format and bit depth as well as other important format information used by the HEVC video elementary stream. Each type of such information may be required to be identical in all parameter sets, if present, in a single HEVC configuration record. Further, in some cases, if two sequences differ in any type of such information, two different HEVC configuration records may be needed. Further, if the two sequences differ in color space indications in their VUI information, then two different configuration records may also be required.

Further, the decoder configuration record generated by video file creation module 72 may be externally framed. When the decoder configuration record is externally framed its size may be supplied by the structure which contains it. The decoder configuration record may also contain a version field. In some cases, compatible extensions to the decoder configuration record may extend it and will not change the configuration version code. In some cases, file readers should be prepared to ignore unrecognized data beyond the definition of the data they understand.

In addition to generating a decoder configuration recorder record, video file creation module 72 may further be configured to assemble access units including all NAL units for a particular time instance. Referring again to FIG. 5, NAL unit constructor 74 may form NAL units including encoded video data. As describe above with respect to HEVC media file 142 described in FIG. 1, types of NAL units may include: AU delimiter NAL unit, a SEI NAL unit, and slice NAL units. As further described with respect to the example decoder record syntax and semantics additional types of NAL units may include: SPS NAL units, PPS NAL units, APS NAL units, and declarative SEI NAL units.

In one example, NAL unit constructor 74 may be configured to define NAL units based on a decoder configuration record according to the following syntax:

```
aligned(8) class HEVCSample
{
    unsigned int PictureLength = sample_size; //Size of
HEVCSample from SampleSizeBox
    for (i=0; i<PictureLength; )   //to end of the picture
    {
        unsigned
int((HEVCDecoderConfigurationRecord.LengthSizeMinusOne+1)
*8)
        NALUnitLength;
        bit(NALUnitLength * 8) NALUnit;
        i += (HEVCDecoderConfigurationRecord.
```

-continued

```
LengthSizeMinusOne+1) + NALUnitLength;
    }
}
```

In the example syntax, NALUnitLength may indicate the size of a NAL unit in bytes. The length field may include the size of both the NAL header and the RBSP payload but does not necessarily include the length field itself. Further, NALUnit may contain a single NAL unit. The syntax of a NAL unit may be defined in ISO/IEC 23008-HEVC and may include both the NAL header and the variable length encapsulated byte stream payload.

Further, in some examples, video file creation module 72 may further be configured to assemble access units including NAL units according to constraints defined by a file format. For example, in one case, where a parameter set is allowed to be stored within a sample to be used for a coded picture it must be sent prior to the sample containing that picture or in the sample for that picture. Referring to FIG. 1, if a picture is contained within access unit 150B, according to this example constraint, for a parameter set to be used with access unit 150B, it must be stored in metadata box 144, access unit 150A or access unit 150B. It should be noted that storing parameter sets in the sample descriptions of a video stream provides a simple and static way to supply parameter sets. However, storing parameter sets in samples may be more complex than storing parameter sets in the sample description, but allows for more dynamism in the case of parameter set updates and in the case of adding additional parameter sets. A parameter set update refers to a particular parameter set's content being, but the ID of the parameter set remains that same.

In addition, a file format used by video creation module 72 may define the format of access units in an HEVC video elementary stream, which may also be referred to as HEVC visual sample entries. In one example, the syntax of an access unit may be configured via the decoder specific configuration for the HEVC elementary stream. Further, in one example, the sample description name and format associated with one or more access units may be defined as follows: (1) box types may be defined as 'hvc1' or 'hvcC'; (2) a container may be defined as Sample Table Box ('stbl'); (3) a mandatory entry may include an 'hvc1' sample entry; and (4) a quantity may be defined to allow one or more sample entries to be present. Further, in one example, an HEVC visual sample entry may be required to contain an HEVC Configuration Box, as further described below. In some examples an HEVC Configuration Box may include an HEVC decoder configuration record, as described above.

An optional syntax element MPEG4 BitRateBox may be present in a HEVC visual sample entry to signal the bit rate information of the HEVC video stream. Extension descriptors that should be inserted into the Elementary Stream Descriptor, when used in MPEG-4, may also be present. In some examples, multiple sample descriptions may be used, as permitted by the ISO Base Media File Format specification, to indicate sections of video that use different configurations or parameter sets.

In some examples, the sample entry name 'hvc1' may only be used when the stream to which this sample entry applies is a compliant and usable HEVC stream as viewed by an HEVC decoder operating under the configuration (including profile and level) given in the HEVCConfigurationBox.

In one example, video file creation module 72 may be configured to define HEVC visual sample entries according to the following syntax:

```
// Visual Sequences
class HEVCConfigurationBox extends Box('hvcC') {
    HEVCDecoderConfigurationRecord( ) HEVCConfig;
}
class HEVCSampleEntry( ) extends VisualSampleEntry ('hvc1'){
    HEVCConfigurationBox    config;
    MPEG4BitRateBox ( );                    // optional
    MPEG4ExtensionDescriptorsBox ( ); // optional
    extra_boxes                 boxes;      // optional
}
```

Further, in the example syntax provide above, Compressomame as defined in the base class VisualSampleEntry may indicate the name of the compressor used with the value "013HEVC Coding" being recommended (012 is 10, the length of the string in bytes). Syntax elements Compressomame may be further defined according to HEVCFF. Syntax element config may be defined according to a decoder configuration record.

Video file creation module 72 may further be configured to assemble access units including NAL units where the width and height fields are included in a VisualSampleEntry. In one example, the width and height fields in a VisualSampleEntry must correctly document the cropped picture dimensions (visual presentation size) of the HEVC stream that is described by that entry. In one example, the width and height fields do not reflect any changes in size caused by SEI messages such as pan-scan. In some examples, the visual handling of SEI messages such as pan-scan is both optional and terminal-dependent. Further, in some case, if the width and height of the sequence changes, then a new sample description is needed. In some examples, the width and height fields in the track header may not be the same as the width and height fields in the one or more than one VisualSampleEntry in the video track. As specified in the ISO Base Media File Format, if normalized visual presentation is needed, all the sequences may be normalized to the track width and height for presentation.

After video file creation unit 72 generates a video file, video file creation unit 72 may pass the video file to video file output interface 76. Video file output interface 76 may output the video file, e.g., to output interface 22 of source device 20. In some examples, video file output interface 76 may output the video file to a storage medium of source device 20 (not shown) or storage device 32.

Figure 6:
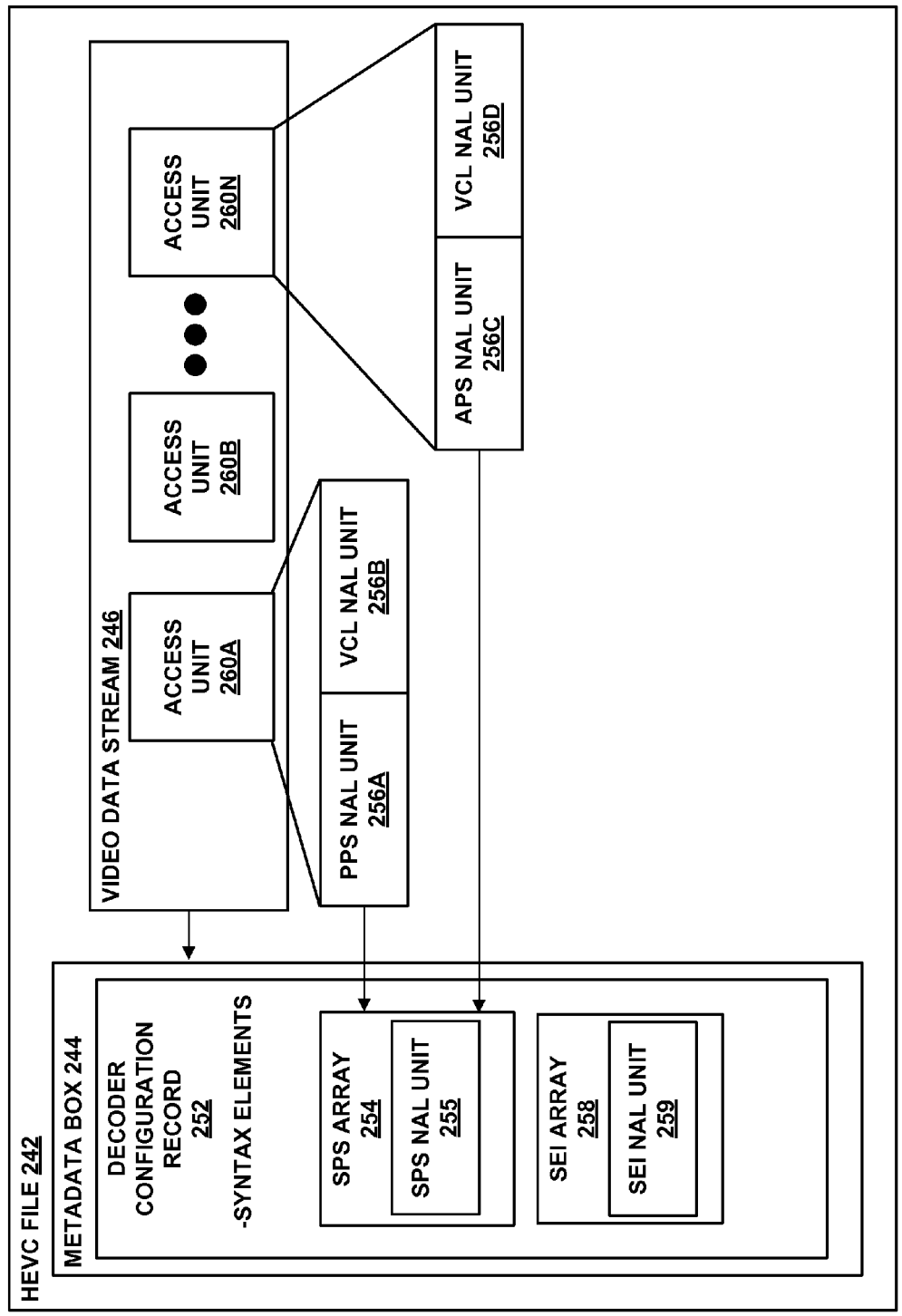
FIG. 6 is a conceptual diagram illustrating the structure of an example media file that may be generated according to the techniques described in this disclosure.

FIG. 6 is a conceptual diagram illustrating the structure of an example HEVC media file based on the ISOBMFF and the current HEVCFF. HEVC media file 242 represents an example of a file format text using the techniques of this disclosure where (1) parameter sets can either be included in the sample description or in the samples of the stream to which the sample description applies; (2) different types of parameter sets are not bundled together when it comes to whether they are included in the sample description or in the samples of the stream to which the sample description applies; (3) a sample description includes an array for each type of parameter set, and the array for a particular type of parameter set can only include parameter set NAL units of that particular type and the sample description also includes an array for SEI NAL units containing declarative SEI messages; (4) stream properties are included in the sample description. It should be noted that the example HEVC media file 242 in FIG. 6 is intended to illustrate the logical relationship between video data streams and metadata. For the sake of brevity, the complete encapsulate structure of the HEVC media file 242 has not been illustrated. However, HEVC media file 242 may utilize boxes and encapsulation structures defined according to HEVCFF. HEVC media file may be generated by video file creation unit 72 according to the example syntax and constraints described above.

In the example illustrated in FIG. 6, HEVC media file 242 includes a metadata box 244 and video data stream 246. Metadata box 244 may be similar to an ISOBMFF 'moov' box and may contain data for video data streams 266, such as decoder configuration record 250. In one example metadata table may be a sample table box. Both metadata box 244 and decoder configuration record 250 may form portions of a sample description. In one example, decoder configuration record 250 may be generated using the example syntax described above and may include information regarding parameter sets and SEI NAL unit messages. Further, decoder configuration record includes SYNTAX ELEMENTS. SYNTAX ELEMENTS may include information regarding stream properties, such as spatial resolution. In one example, decoder configuration record 252 may include SPS array 254 and SEI array 258. SPS array 254 may include SPS NAL Unit 255. SEI array 258 may include SEI NAL unit 259.

Video data streams 246 may correspond to a video or visual track described in HEVCFF. Thus, video data stream 246 may therefore may use: (1) a handler_type of 'vide' in the HandlerBox; (2) a video media header 'vmhd'; and (3) a derivative of the VisualSampleEntry. Video data stream 246 may include a plurality of access units 260A-260N. Access units 260A-260N may be generated by video file creation unit 72 according to the example syntax and constraints described above. As illustrated in FIG. 6 access unit 260A includes PPS NAL unit 256A and a VCL NAL unit 256B and access unit 260N includes a APS NAL unit 256C and VCL NAL 256D. In one example, video data stream 246 may include one or more temporal layers and metadata box 244 may further include an indication of whether video data stream 246 is divided into one or more tracks.

In this manner HEVC file 242, represents an example file where (1) parameter sets are included in the sample description and in the samples of the stream to which the sample description applies; (2) different types of parameter sets are not bundled together when it comes to whether they are included in the sample description or in the samples of the stream to which the sample description applies; (3) a sample description includes an array for each type of parameter set and the sample description also includes an array for SEI NAL units containing declarative SEI messages; and (4) stream properties are included in the sample description.

Referring again to FIG. 3, source device 12 may be configured to output encoded video data according one or more file formats and destination device 14 may be configured to receive encoded video data in one or more file formats, such as those described herein. The video files described herein may be transmitted directly to destination device 14 via output interface 22 of source device 12. The video file may also (or alternatively) be stored onto storage device 32 for later access by destination device 14 or other devices, for decoding and/or playback.

Destination device 14 includes an input interface 28, a decapsulation module 29, a video decoder 30, and a display device 34. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server. In some examples, such syntax elements may include syntax elements signaling intra-coding modes as described in this disclosure.

Display device 34 may be integrated with, or external to, destination device 14. In some examples, destination device 14 may include an integrated display device and also be configured to interface with an external display device. In other examples, destination device 14 may be a display device. In general, display device 34 displays the decoded video data to a user, and may comprise any of a variety of display devices such as a liquid crystal display (LCD), a plasma display, an organic light emitting diode (OLED) display, or another type of display device.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. In some cases, output interface 22 may include a modulator/demodulator (modem) and/or a transmitter.

Alternatively, encoded data may be output from output interface 22 to a storage device 32. Similarly, encoded data may be accessed from storage device 32 by input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

Although not shown in FIG. 3, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Decapsulation module 29 may be configured to receive a video file parse the video file such that video decoder 30 may output decoded video data. In some examples, decapsulation module 29 may perform reciprocal processes of encapsulation module 72. Video decoder 30 may, in some examples, perform a decoding pass generally reciprocal to the encoding pass described with respect to video encoder 20 from FIG. 4.

Figure 7:
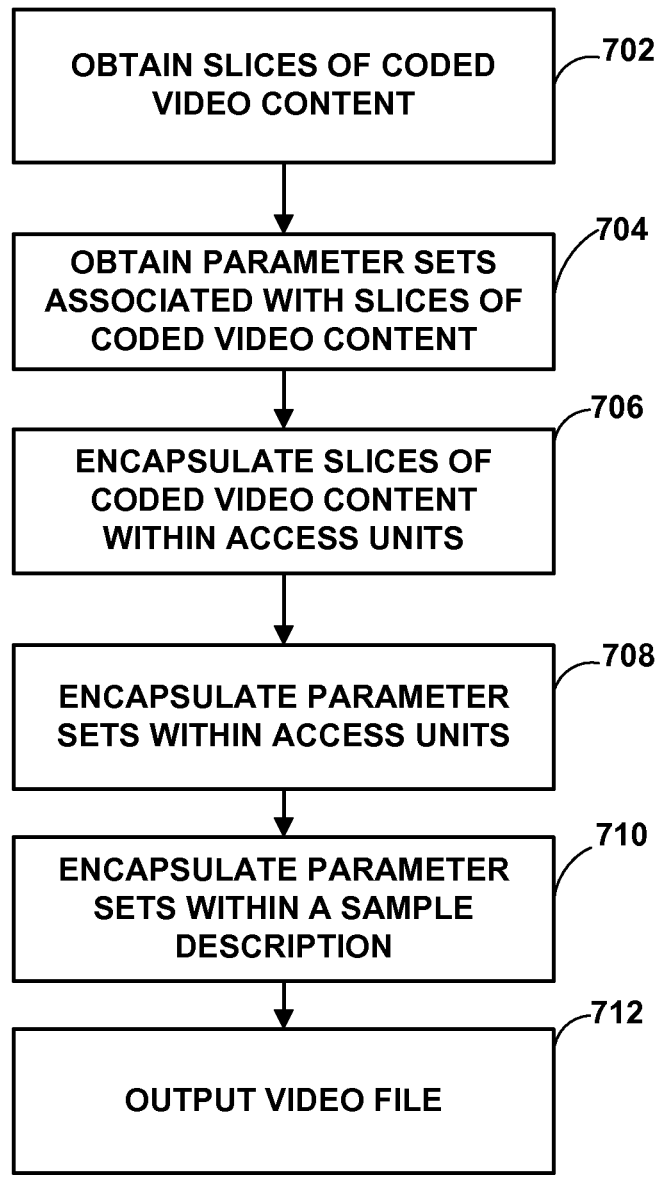
FIG. 7 is a flowchart illustrating an example of generating a video file including coded video content according to the techniques of this disclosure.

FIG. 7 is a flowchart illustrating an example of generating a video file including coded video content according to the techniques of this disclosure. The process described in FIG. 7 may be performed by a video coding device which may include any combination of source device 20, encapsulation module 21, and video creation module 72 described herein. A video coding device may obtain slices of coded video content (702). Coded video content may include a plurality of slices coded according to HEVC. The video coding device may obtain parameter sets associated with slice of video content (704). Parameters sets may include SPS, PPS, and/or APS. The video coding device may encapsulate slices of coded video content within access units (706). Access units may be defined as described herein. The video coding device may encapsulate parameter sets within access units (708). Parameter sets may be encapsulated within access units according to the techniques described herein. The video coding device may encapsulate parameter sets within a sample description (710). In one example, PPS may be encapsulated within one or more access units while SPS are capsulated within a sample description. The video coding device outputs the video file (712). The video file may further be generated based defined on a file format wherein the file format is based on the techniques described herein.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating a video file including coded single-layer video content, the method comprising:
   obtaining at least a portion of the coded single-layer video content, wherein an entirety of the coded single-layer video content is associated with a single spatial resolution;
   identifying a plurality of slices of the obtained coded single-layer video content;
   based on the identification of the plurality of slices, encapsulating the plurality of slices of the obtained coded single-layer video content within a plurality of access units of a video stream;
   obtaining stream property information associated with the video stream, the stream property information comprising a plurality of stream properties of the video stream, the plurality of stream properties including the single spatial resolution associated with the coded single-layer video content; and
   based on the stream property information including the plurality of stream properties of the video stream, encapsulating the obtained stream property information within a sample description of a file track, wherein the sample description is signaled out of band with respect to one or more samples of the video stream.

2. The method of claim 1, wherein the sample description further includes information indicating a geometry region covered by a set of tiles.

3. The method of claim 1, wherein the sample description further includes a bit-depth value for the slices of the coded single-layer video content.

4. The method of claim 1, wherein the plurality of stream properties further includes a frame rate of the video stream.

5. A device for generating a video file including coded single-layer video content, the device comprising:
   a memory device for storing the coded single-layer video content; and
   one or more processors for processing the coded single-layer video content, the one or more processors being configured to:
      obtain at least a portion of the coded single-layer video content, wherein an entirety of the coded single-layer video content is associated with a single spatial resolution;
      identify a plurality of slices of the obtained coded single-layer video content;
      based on the identification of the plurality of slices, encapsulate the plurality of slices of the obtained coded single-layer video content within a plurality of access units of a video stream;
      obtain stream property information associated with the video stream, the stream property information comprising a plurality of stream properties of the video stream, the plurality of stream properties including the single spatial resolution coded single-layer video content;
      based on the stream property information including the plurality of stream properties of the video stream, encapsulate the obtained stream property information within a sample description of a file track, wherein the sample description is signaled out of band with respect to one or more samples of the video stream; and store at least a portion of the video stream to the memory device.

6. The device of claim 5, wherein the sample description further includes information indicating a geometry region covered by a set of tiles.

7. The device of claim 5, wherein the sample description further includes a bit-depth value for the slices of the coded single-layer video content.

8. A non-transitory computer-readable storage medium having instructions stored thereon that upon execution cause one or more processors of a video coding device to:
    obtain at least a portion of coded single-layer video content, wherein an entirety of the coded single-layer video content is associated with a single spatial resolution;
    identify a plurality of slices of the obtained coded single-layer video content;
    based on the identification of the plurality of slices, encapsulate the plurality of slices of the obtained coded single-layer video content within a plurality of access units of a video stream;
    obtain stream property information associated with the video stream, the stream property information comprising a plurality of stream properties of the video stream, the plurality of stream properties including the single spatial resolution associated with the coded single-layer video content; and
    based on the stream property information including the plurality of stream properties of the video stream, encapsulate the obtained stream property information within a sample description of a file track, wherein the sample description is signaled out of band with respect to one or more samples of the video stream.

9. The non-transitory computer-readable storage medium of claim 8, wherein the sample description further includes information indicating a geometry region covered by a set of tiles.

10. The non-transitory computer-readable storage medium of claim 8, wherein the sample description further includes a bit-depth value for the slices of the coded single-layer video content.

11. An apparatus configured to generate a video file including coded single-layer video content, the apparatus comprising:
    means for obtaining at least a portion of the coded single-layer video content, wherein an entirety of the coded single-layer video content is associated with a single spatial resolution;
    means for identifying a plurality of slices of the obtained coded single-layer video content;
    means for encapsulating, based on the identification of the plurality of slices, the plurality of slices of the obtained coded single-layer video content within a plurality of access units of a video stream;
    means for obtaining stream property information associated with the video stream, the stream property information comprising a plurality of stream properties of the video stream, the plurality of stream properties including the single spatial resolution associated with the coded single-layer video content; and
    means for encapsulating, based on the stream property information including the plurality of stream properties of the video stream, the obtained stream property information within a sample description of a file track, wherein the sample description is signaled out of band with respect to one or more samples of the video stream.

12. A method of processing a video file including coded single-layer video content, the method comprising:
    obtaining a file track, wherein the file track includes a plurality of slices of the coded single-layer video content included in a video stream, and wherein an entirety of the coded single-layer video content is associated with a single spatial resolution;
    obtaining a plurality of stream properties associated with the video stream from a sample description of the file track, wherein the sample description is signaled out of band with respect to one or more samples of the video stream; and
    determining that the plurality of stream properties includes the single spatial resolution associated with the coded single-layer video content, and wherein the sample description is signaled out of band with respect to one or more samples of the video stream.

13. The method of claim 12, wherein the sample description further includes information indicating a geometry region covered by a set of tiles.

14. The method of claim 12, wherein the sample description further includes a bit-depth value for the slices of the coded single-layer video content.

15. A device for processing a video file, the device comprising:
    a memory device for storing coded single-layer video content; and
    one or more processors for processing the coded single-layer video content, the one or more processors being configured to:
    access at least a portion of a video stream from the memory device;
    obtain a file track, wherein the file track includes a plurality of slices of the coded single-layer video content included in the video stream, and wherein an entirety of the coded single-layer video content is associated with a single spatial resolution;
    obtain a plurality of stream properties associated with the video stream from a sample description of the file track, wherein the sample description is signaled out of band with respect to one or more samples of the video stream; and
    determine that the plurality of stream properties includes the single spatial resolution of associated with the coded single-layer video content.

16. The device of claim 15, wherein the sample description further includes information indicating a geometry region covered by a set of tiles.

17. The device of claim 15, wherein the sample description further includes a bit-depth value for the slices of the coded single-layer video content.

18. The device of claim 15, wherein the plurality of stream properties further includes a frame rate of the video stream.

19. A non-transitory computer-readable storage medium having instructions stored thereon that upon execution cause one or more processors of a video coding device to:
    obtain a file track, wherein the file track includes a plurality of slices of coded single-layer video content included in a video stream, and wherein an entirety of the coded single-layer video content is associated with a single spatial resolution;

obtain a plurality of stream properties associated with the video stream from a sample description of the file track, wherein the sample description is signaled out of band with respect to one or more samples of the video stream; and determine that the plurality of stream properties includes the single spatial resolution associated with the coded single-layer video content.

20. The non-transitory computer-readable storage medium of claim 19, wherein the sample description further includes information indicating a geometry region covered by a set of tiles.

21. The non-transitory computer-readable storage medium of claim 19, wherein the sample description further includes a bit-depth value for the slices of the coded single-layer video content.

22. An apparatus configured to process a video file including coded single-layer video content, the apparatus comprising:

means for obtaining a file track, wherein the file track includes a plurality of slices of the coded single-layer video content included in a video stream, and wherein an entirety of the coded single-layer video content is associated with a single spatial resolution;

means for obtaining a plurality of stream properties associated with the video stream from a sample description of the file track, wherein the sample description is signaled out of band with respect to one or more samples of the video stream; and means for determining that the plurality of stream properties includes the single spatial resolution associated with the coded single-layer video content.

* * * * *